US010725492B2

(12) United States Patent
Takahashi et al.

(10) Patent No.: US 10,725,492 B2
(45) Date of Patent: Jul. 28, 2020

(54) OPERATION DEVICE

(71) Applicant: ALPS ALPINE CO., LTD., Tokyo (JP)

(72) Inventors: Kazunari Takahashi, Miyagi (JP); Atsushi Goto, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/433,349

(22) Filed: Jun. 6, 2019

(65) Prior Publication Data

US 2019/0286184 A1    Sep. 19, 2019

Related U.S. Application Data

(63) Continuation of application No. PCT/JP2017/035244, filed on Sep. 28, 2017.

(30) Foreign Application Priority Data

Dec. 21, 2016  (JP) .................................. 2016-248217

(51) Int. Cl.
*G05G 5/03* (2008.04)
*F16D 57/00* (2006.01)
(Continued)

(52) U.S. Cl.
CPC .............. *G05G 5/03* (2013.01); *B60T 8/4081* (2013.01); *F16D 57/002* (2013.01); *G05G 1/08* (2013.01);
(Continued)

(58) Field of Classification Search
None
See application file for complete search history.

(56) References Cited

U.S. PATENT DOCUMENTS

| 6,380,733 B1 * | 4/2002 | Apel ...................... B60K 37/06 324/207.2 |
| 2003/0030407 A1 | 2/2003 | Maeda |

(Continued)

FOREIGN PATENT DOCUMENTS

| FR | 2935497 A3 * | 3/2010 | ............... G05G 5/03 |
| JP | 2003-050639 | 2/2003 | |

(Continued)

OTHER PUBLICATIONS

Machine Translation of FR 2935497, obtained Feb. 27, 2020.*
International Search Report dated Nov. 28, 2017 in PCT/JP2017/035244 filed on Sep. 28, 2017.

*Primary Examiner* — Richard W Ridley
*Assistant Examiner* — Brian J McGovern
(74) *Attorney, Agent, or Firm* — IPUSA, PLLC

(57) ABSTRACT

An operation device includes an operation body, a support body, and an operational feeling variable unit; wherein the operational feeling variable unit includes a movable load applying mechanism and a magnetic click mechanism; the movable load applying mechanism includes a movable member, a magnetic generating mechanism including a first coil and a first yoke, and a magnetic viscous fluid configured to change in viscosity according to a strength of a magnetic field; wherein the magnetic viscous fluid is filled in a first gap between the first yoke and the movable member; the magnetic click mechanism includes a first magnetic body configured to move in an interlocked manner with the motion of the operation body, and a second magnetic body facing the first magnetic body. The first magnetic body and/or the second magnetic body are magnetized such that different magnetic poles alternate along a movement direction of the operation body.

8 Claims, 13 Drawing Sheets

(51) Int. Cl.
  G05G 1/10 (2006.01)
  H01F 1/44 (2006.01)
  B60T 8/40 (2006.01)
  G05G 1/08 (2006.01)
  F16D 121/28 (2012.01)
  H01F 7/20 (2006.01)
  B60T 7/08 (2006.01)
  B60T 7/04 (2006.01)

(52) U.S. Cl.
  CPC ................ G05G 1/10 (2013.01); H01F 1/44 (2013.01); *B60T 7/042* (2013.01); *B60T 7/085* (2013.01); *F16D 2121/28* (2013.01); *F16D 2200/0034* (2013.01); *G05G 2505/00* (2013.01); *H01F 7/20* (2013.01)

(56) References Cited

U.S. PATENT DOCUMENTS

| | | |
|---|---|---|
| 2003/0079948 A1 | 5/2003 | Jolly et al. |
| 2006/0280575 A1* | 12/2006 | Ruettiger ............... B60K 37/06 411/15 |
| 2007/0181391 A1* | 8/2007 | St. Clair ............... F16D 57/002 188/267 |
| 2009/0015360 A1* | 1/2009 | North ...................... G06F 3/016 335/209 |
| 2011/0128135 A1 | 6/2011 | Periquet et al. |
| 2015/0221426 A1* | 8/2015 | Furuki .................. H01H 19/11 335/219 |
| 2017/0227980 A1 | 8/2017 | Hafez et al. |

FOREIGN PATENT DOCUMENTS

| | | |
|---|---|---|
| JP | 2005-507061 | 3/2005 |
| JP | 2011-519099 | 6/2011 |
| JP | 2017-530474 | 10/2017 |
| WO | 2016/079987 | 5/2016 |

* cited by examiner

OPERATION DEVICE

CROSS-REFERENCE TO RELATED APPLICATION

The present application is a continuation application of International Application No. PCT/JP2017/035244 filed on Sep. 28, 2017, which is based on and claims priority to Japanese Patent Application No. 2016-248217 filed on Dec. 21, 2016. The contents of these applications are incorporated herein by reference in their entirety.

BACKGROUND OF THE INVENTION

1. Field of the Invention

The present invention relates to an operation device that is capable of providing an operator with an operational feeling when operated by the operator.

2. Description of the Related Art

In recent years, various types of operation devices with a force feedback function have been proposed, in which when an operator operates an operation member, the operator is provided with an external force (sense of force), such as resistance and thrust, in accordance with the amount of operation and the direction of operation of the operation member, such that the operational feeling can be improved and the desired operation can be reliably performed. In particular, when operating an in-vehicle control device, such as an air conditioner, audio equipment, or a navigation system, blind operation is often performed instead of operating while viewing the device, and it is effective to provide a sense of force with respect to the operation member (operation knob), also in terms of safety.

A manual input device 800 for an automobile using such an operation device has been proposed in Patent Document 1 (conventional example 1). FIG. 12 is a vertical cross-sectional view of a main part of a basic configuration of the manual input device 800 according to a conventional example 1.

The manual input device 800 illustrated in FIG. 12 includes: a knob 880 (an operation member) manually operated and rotated by the driver (operator); a planetary gear mechanism having a carrier shaft 851 integrally disposed with the knob 880; a cylindrical ring case 860 (a fixing member) that constantly fixes a gear ring 862 of the planetary gear mechanism; a motor 810 having an output shaft 811 engaged with a sun gear 832 of the planetary gear mechanism; an encoder 830 (a detection means) that detects the rotation of the output shaft 811 of the motor 810; and a control means that controls the rotation of the motor 810 according to the detection result of the encoder 830. The manual input device 800 rotates the motor 810 at a predetermined timing and transmits this rotational force to the knob 880 via the planetary gear mechanism, to provide a predetermined operational feeling to the operator.

However, although this manual input device 800 can provide a good operational feeling, because the motor 810 is used, it has been difficult to respond to the need for further miniaturization. Accordingly, a method of applying an external force (sense of force) such as resistance and thrust corresponding to the amount of operation and the direction of operation of the operation member without using the motor 810, has been explored.

In Patent Document 2 (conventional example 2), a manual brake 911 using a magnetic field responsive material (magnetic viscous fluid) whose own fluidity is affected by a magnetic field generating means, is proposed. FIG. 13 is a vertical cross-sectional view of the manual brake 911 of a conventional example 2.

The manual brake 911 illustrated in FIG. 13 includes: a housing 913 having a first housing chamber 915 and a second housing chamber 917; a closure plate 919 that occludes the open end side of the housing 913; a shaft 923 extending through the second housing chamber 917 to the first housing chamber 915; a rotor 921 disposed integrally at the end of the shaft 923 and arranged in parallel with and inside the first housing chamber 915; a magnetic field generator 929 disposed within the first housing chamber 915 and located just adjacent to the outer periphery of the rotor 921; a magnetic field responsive material 941 disposed and filled in the first housing chamber 915 to surround the rotor 921; and a control means 925 provided in the second housing chamber 917 for controlling and monitoring braking operations. The magnetic field generator 929 also includes a coil 931 and a pole piece 933 arranged to surround the three sides of the coil 931.

When the coil 931 is energized, a magnetic flux J37, indicated by a dashed line in FIG. 13, is generated, so that as the magnetic flux J37 is generated, soft magnetic or magnetizable particles in the magnetic field responsive material 941 are arranged along the magnetic flux J37. Therefore, the resistance applied to the rotor 921 by the magnetic field responsive material 941 increases with respect to the direction in which this arrangement of particles is cut, i.e., the rotational direction of the rotor 921 which rotates. Accordingly, the manual brake 911 has a braking effect of stopping the rotational motion of the shaft 923, by using the magnetic field responsive material 941 and the rotor 921.

Patent Document 1: Japanese Laid-open Patent Publication No. 2003-50639

Patent Document 2: Japanese National Publication of International Patent Application No. 2005-507061

SUMMARY OF THE INVENTION

According to one aspect of the present invention, there is provided an operation device including an operation member including an operation body that moves in an operation direction according to an operation by an operator; a support body configured to freely support a motion of the operation body; and an operational feeling variable unit configured to vary an operational feeling that is perceived by the operator, wherein the operation body includes a movable shaft that enables the motion, the operational feeling variable unit includes a movable load applying mechanism configured to apply a load to the operation body; and a magnetic click mechanism configured to apply a variable load to the operation body by a magnetic force, the movable load applying mechanism includes a movable member configured to move in engagement with the movable shaft; a magnetic generating mechanism facing the movable member by interposing a gap; and a magnetic viscous fluid configured to change in viscosity according to a strength of a magnetic field, the magnetic viscous fluid being present in at least a part of the gap, the magnetic generating mechanism includes a first coil configured to generate a magnetic field by being energized; a first yoke disposed on one side of the movable member so as to surround the first coil; and a control unit configured to control the energizing of the first coil, and wherein the magnetic viscous fluid is filled in a first gap that is the gap between the first yoke and the movable member, the magnetic click mechanism includes a first magnetic body configured to move in an interlocked manner with the motion of the operation body; and a second magnetic body disposed facing the first magnetic body, and wherein at least one of the first magnetic body and the second magnetic body is magnetized such that different magnetic poles alternate along a movement direction of the operation body.

BRIEF DESCRIPTION OF THE DRAWINGS

FIG. 3A is a top view viewed from the Z1 side indicated in FIG. 1, and FIG. 3B is a front view viewed from the Y2 side indicated in FIG. 1;

FIG. 6A is an upper perspective view of the operational feeling variable means, and FIG. 6B is a side view of the operational feeling variable means viewed from the Y2 side indicated in FIG. 6A;

FIG. 7A is an upper exploded perspective view, and FIG. 7B is a downward exploded perspective view;

FIG. 8A is a diagram illustrating a magnetic viscous fluid in which a magnetic field is not applied, and FIG. 8B is a diagram illustrating a magnetic viscous fluid in which a magnetic field is applied;

EMBODIMENTS OF THE INVENTION

It is conceivable to use the function of the magnetic field responsive material 941 (magnetic viscous fluid) of the conventional example 2 described above, to apply an external force (senses of force) such as resistance and thrust corresponding to the amount of operation and the direction of operation of the operation member, without using a motor. However, there is a problem that the configuration of the conventional example 2 only applies an external force (sense of force) such as resistance or thrust corresponding to the amount of operation and the direction of operation of the operation member, and a click feeling, which is required as one of the operational feelings, cannot be clearly obtained.

The operation device according to an aspect of the present invention can achieve a good click feeling by using a magnetic viscous fluid.

Hereinafter, embodiments of the present invention will be described with reference to the drawings.

First Embodiment

Figure 1:
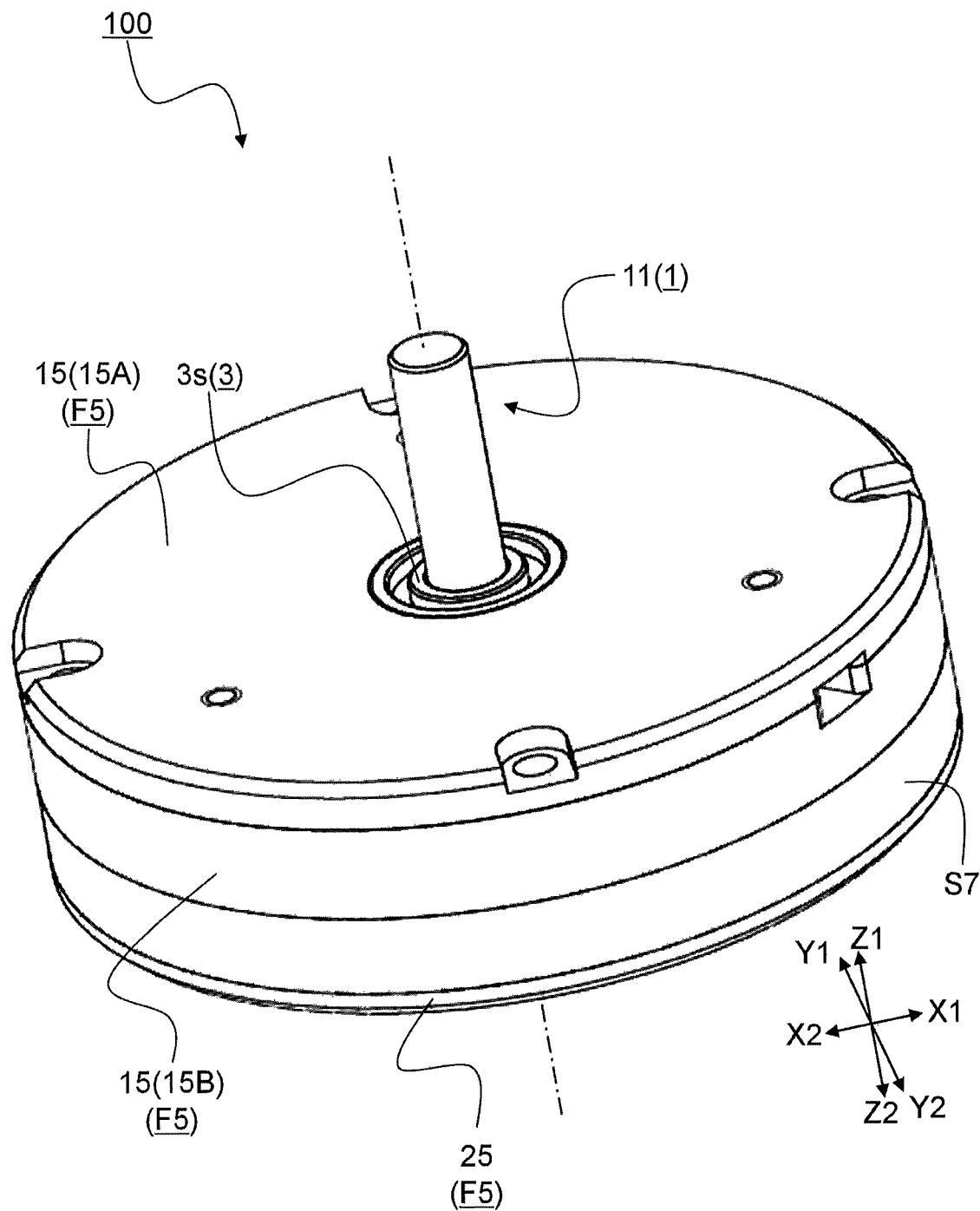
FIG. 1 is an upper perspective view of an operation device according to a first embodiment of the present invention.
Figure 2:
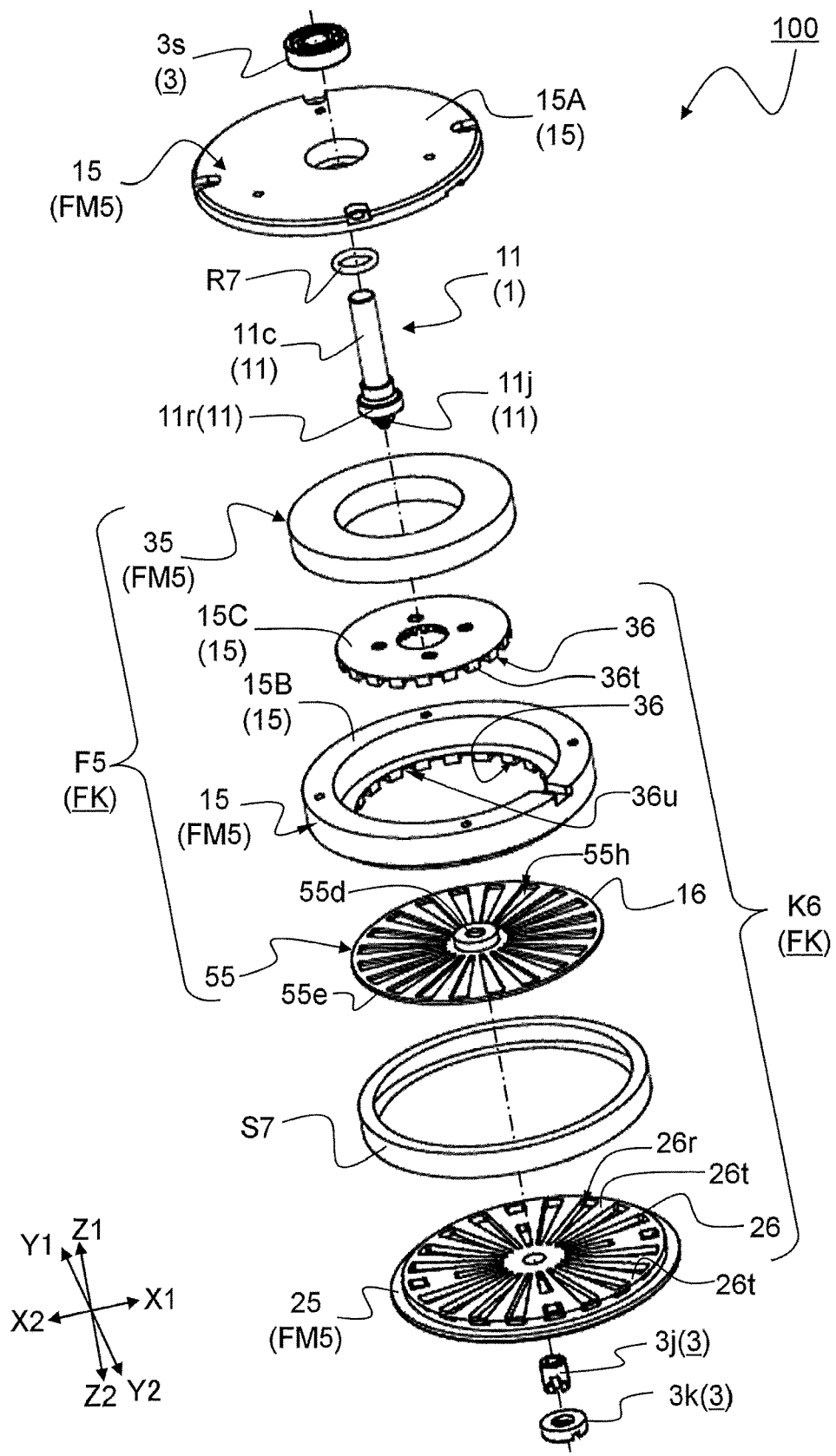
FIG. 2 is an exploded perspective view of the operation device according to the first embodiment of the present invention.
Figure 3A:
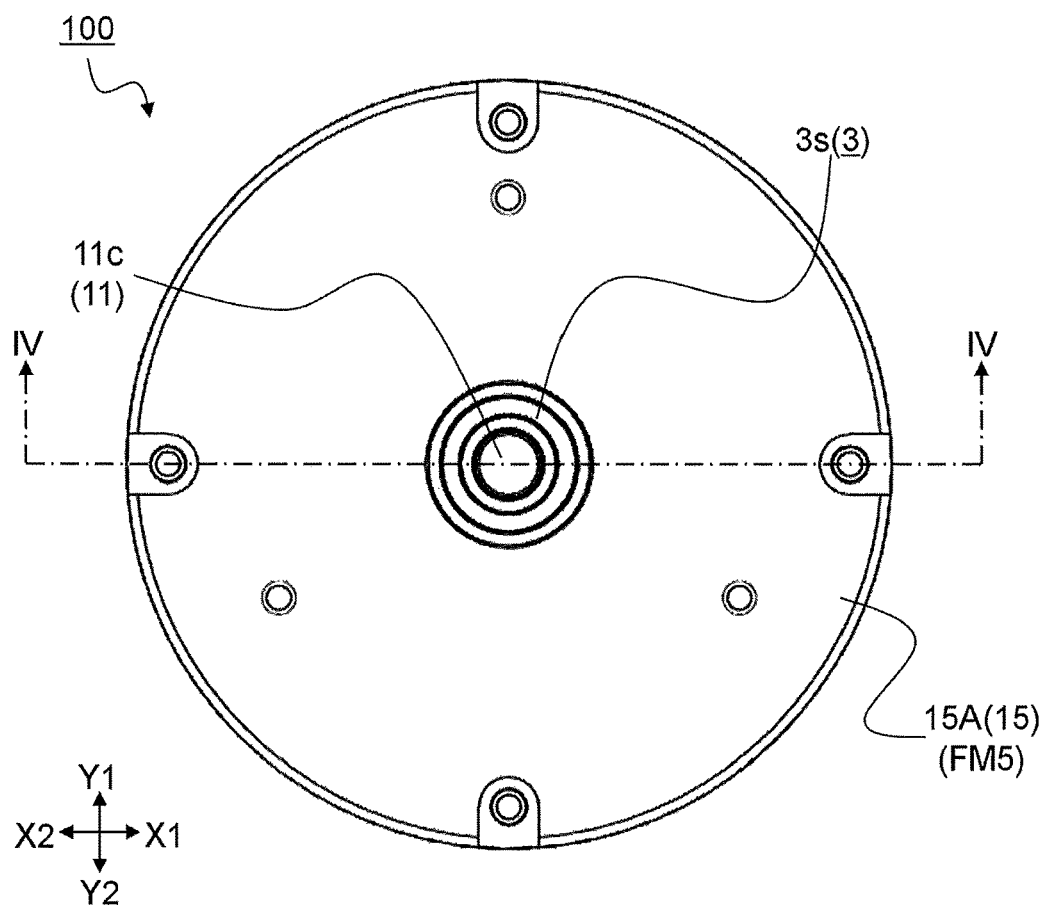
FIGS. 3A and 3B are diagrams illustrating the operation device according to the first embodiment of the present invention.
Figure 3B:
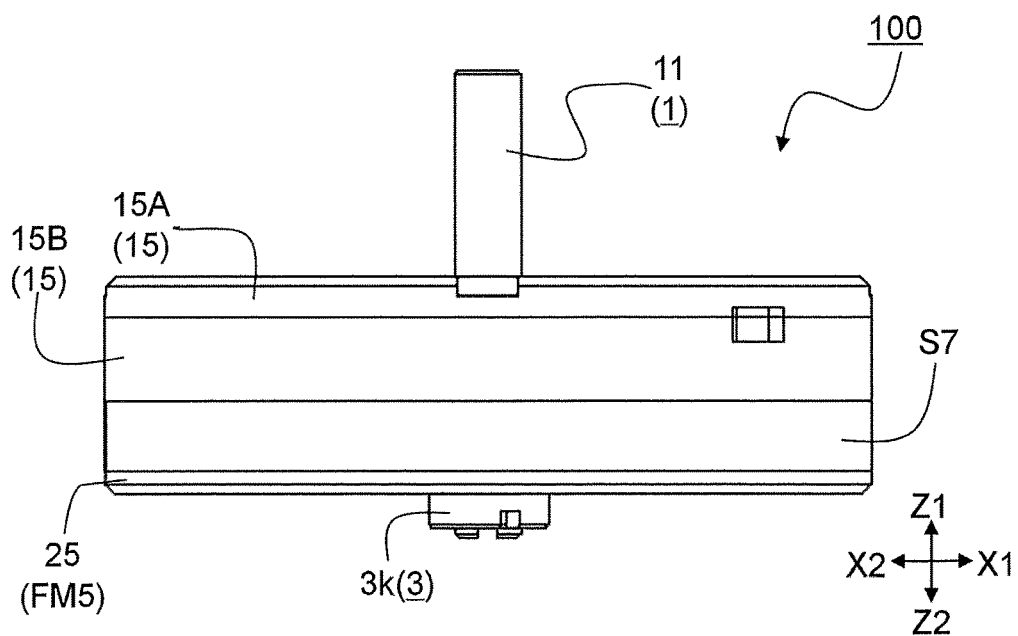
Figure 4:
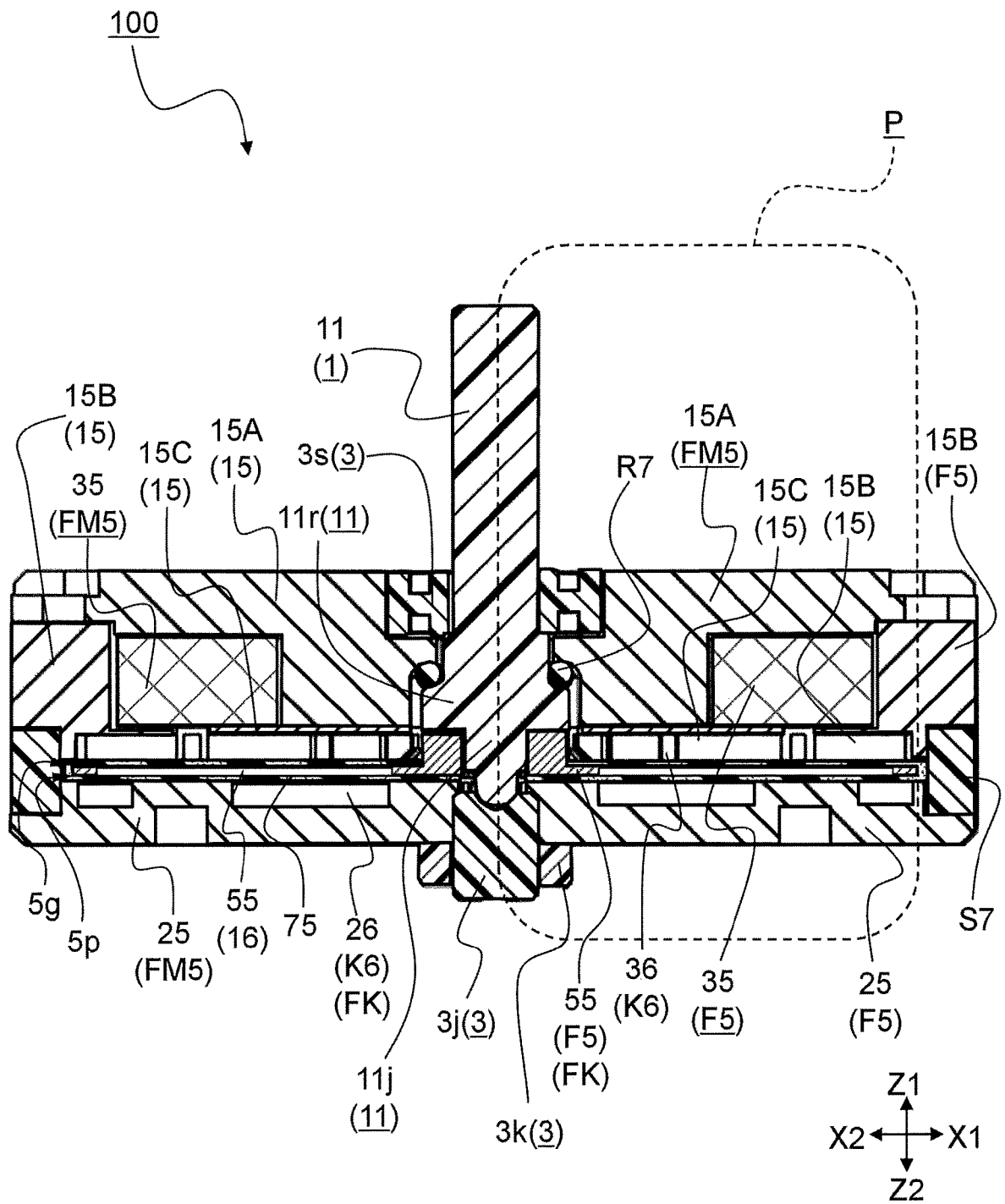
FIG. 4 is a cross-sectional view cut along a IV-IV line indicated in FIG. 3A, illustrating the operation device according to the first embodiment of the present invention.

FIG. 1 is an upper perspective view of an operation device 100 according to a first embodiment of the present invention. FIG. 2 is an exploded perspective view of the operation device 100. FIG. 3A is a top view of the operation device 100 viewed from the Z1 side illustrated in FIG. 1, and FIG. 3B is a front view of the operation device 100 viewed from the Y2 side illustrated in FIG. 1. FIG. 4 is a cross-sectional view of the operation device 100 cut along a IV-IV line illustrated in FIG. 3A.

The operation device 100 according to the first embodiment of the present invention has an appearance as illustrated in FIGS. 1, 3A and 3B, and as illustrated in FIG. 2, the operation device 100 is mainly configured with an operation member 1 having an operation body 11 that moves in the operation direction as operated by an operator, a support body 3 that freely supports the motion of the operation body 11, and an operational feeling variable means FK that can vary the operational feeling that is felt by the operator. Further, as illustrated in FIG. 2, the operational feeling variable means FK includes a movable load applying mechanism F5 for applying a load to the operation body 11 and a magnetic click mechanism K6 for applying a variable load to the operation body 11 by a magnetic force.

The movable load applying mechanism F5, as illustrated in FIG. 4, is configured with a movable member 55 which moves in engagement with the operation body 11, a magnetic generating mechanism FM5 that faces the movable member 55 by interposing a gap, and a magnetic viscous fluid 75 (see FIG. 5, which will be described later) which is present in the gap. The magnetic click mechanism K6 includes a first magnetic body 16 that moves in an interlocked manner with the motion of the operation body 11, a second magnetic body 26 disposed facing the first magnetic body 16, and a third magnetic body 36 disposed facing the second magnetic body 26 by interposing the first magnetic body 16.

In addition to the above-described components, the operation device 100 of the first embodiment includes a sidewall spacer S7 having a ring shape (see FIG. 2) and forming the outer shape (see FIG. 1). In the operation device 100, an operation portion (an operation knob or an operation finger grip, etc.) (not illustrated) of the operation member 1 is engaged to one end side of the operation body 11, and the operation portion is grasped and operated by an operator, so that the operation body 11 rotates in both directions.

In this case, when a rotation detecting means (not illustrated) for detecting the rotational motion of the operation body 11 is provided, the operation device 100 can be used as a rotation operation type input device. For example, a so-called rotary variable resistor, which is composed of a substrate on which a resistor pattern is formed and a slider that slides in contact with a resistor pattern, is used as the rotation detecting means. By engaging the rotary variable resistor with the operation body 11, it is possible to easily detect the rotational motion of the operation body 11. Note that the rotation detecting means is not limited to a rotary variable resistor. For example, a magnetic angular rotation detection device using a permanent magnet and a magnetic detection sensor may be used.

First, the operation member 1 of the operation device 100 will be described. The operation member 1 includes an operation portion (not illustrated) grasped by an operator and the operation body 11 having a movable shaft 11j having the operation portion engaged to an end side thereof.

The operation portion of the operation member 1 is a member such as an operation knob or an operation finger grip that is grasped and operated by an operator, and is engaged to one end side of the operation body 11 for use. The shape of the operation portion is optionally determined according to the product to which the operation portion is applied, in consideration of a shape that is easily operable.

The operation body 11 of the operation member 1 is manufactured by integral injection molding, using a synthetic resin such as poly butylene terephthalate resin (PBT); the operation body 11 including a cylindrical column portion 11c, the movable shaft 11j extending through the center of the column portion 11c and centering on a rotation center, and a ring portion 11r that has one size larger than the column portion 11c and that is disposed on the other end side of the operation body 11. The operation body 11 is configured to rotate by using the movable shaft 11j as the rotation center, the movable shaft 11j enabling the motion of the operation body 11.

Further, as illustrated in FIG. 4, an O-ring R7 is inserted through the column portion 11c and disposed at a joint portion between the column portion 11c and the ring portion 11r. The O-ring R7 mounted herein also has the function of closing the housing space in which the movable member 55 is housed. This prevents the magnetic viscous fluid 75 filled in the housing space from leaking out of the housing space.

Next, the support body 3 of the operation device 100 will be described. As illustrated in FIG. 4, the support body 3 is mainly configured with a shaft bearing portion 3j with which an end portion of the movable shaft 11j of the operation body 11 is made to contact, a fixing portion 3k in which the shaft bearing portion 3j is fixed, and a shaft support portion 3s in which the column portion 11c of the operation body 11 is inserted to guide the column portion 11c. The support body 3 supports the operation body 11 (the operation member 1) so that the operation body 11 can freely move (rotate).

As illustrated in FIG. 4, the shaft bearing portion 3j of the support body 3 has a concave shape on the side facing the movable shaft 11j of the operation body 11. When the operation device 100 is assembled, the end portion of the movable shaft 11j is supported by and in contact with the concave-shaped portion of the shaft bearing portion 3j, allowing the rotational motion of the operation body 11 to be easily performed.

The shaft support portion 3s of the support body 3 has a ring shape having a through hole in the center, and is housed in a recess disposed in the center top portion of the movable load applying mechanism F5 (an upper yoke 15A of a first yoke 15 of the magnetic generating mechanism FM5 to be described later) as illustrated in FIG. 4. Also, the column portion 11c of the operation body 11 is inserted into the through hole of the shaft support portion 3s, and the shaft support portion 3s rotatably supports the column portion 11c (the operation body 11). The shaft bearing portion 3j, the fixing portion 3k, and the shaft support portion 3s are formed by injection molding using a synthetic resin such as polybutylene terephthalate resin (PBT) in the same manner as the operation body 11.

Figure 5:
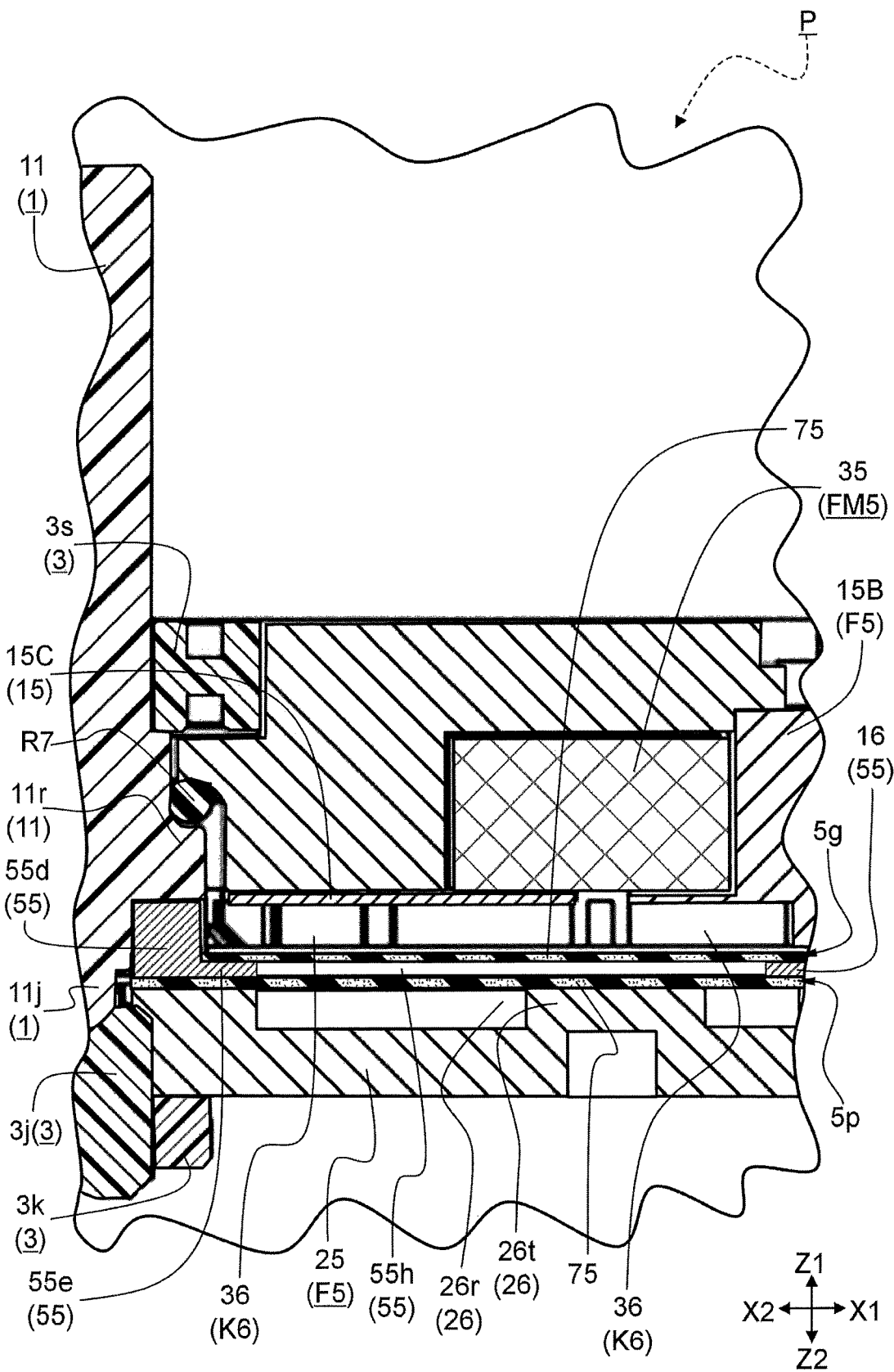
FIG. 5 is an enlarged view of a P portion indicated in FIG. 4, illustrating an operational feeling variable means of the operation device according to the first embodiment of the present invention.
Figure 6A:
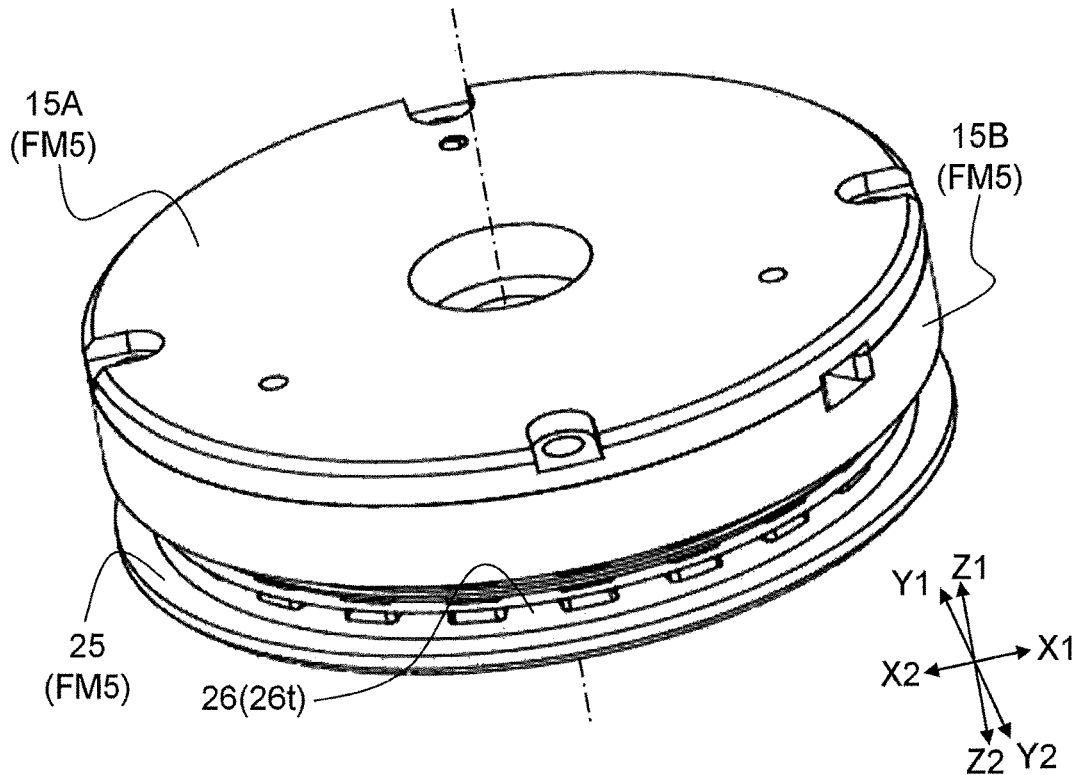
FIGS. 6A and 6B are diagrams illustrating the operational feeling variable means of the operation device according to the first embodiment of the present invention.
Figure 6B:
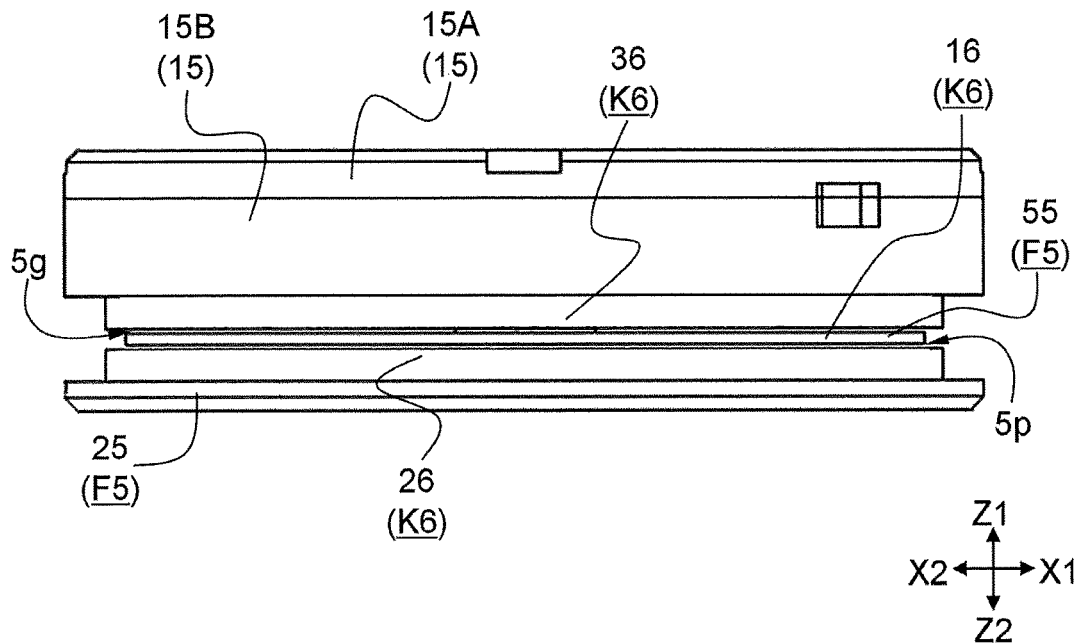
Figure 7A:
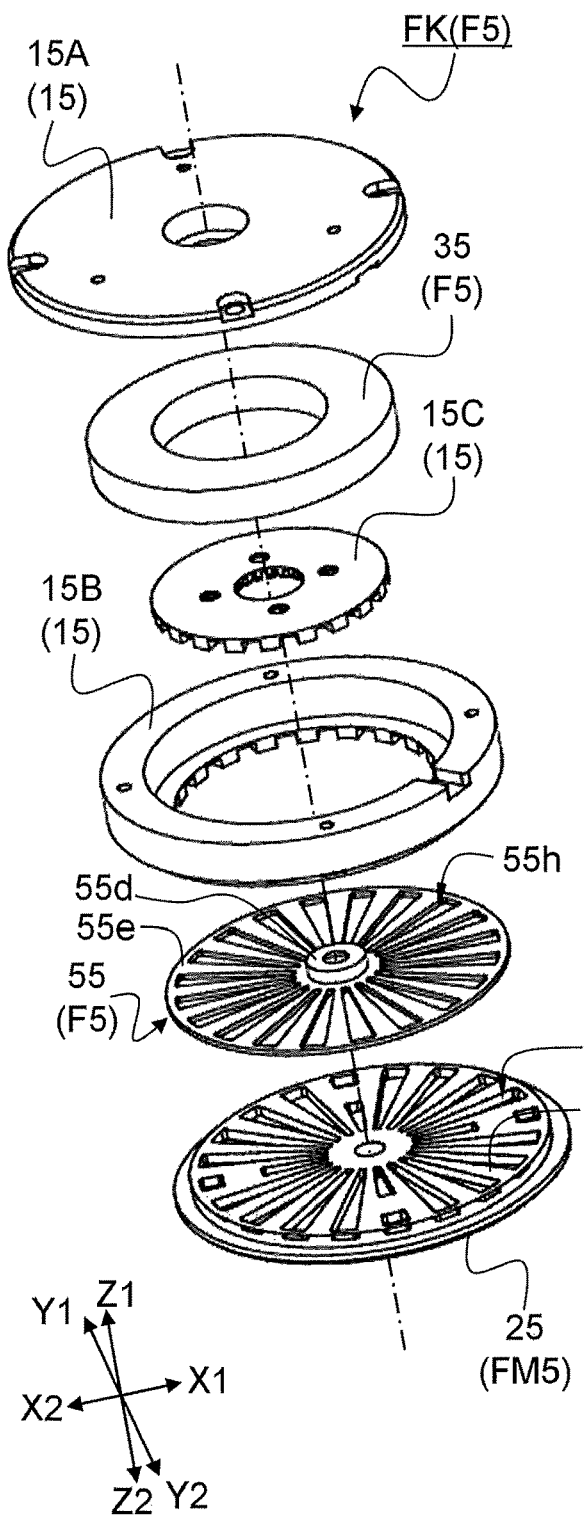
FIGS. 7A and 7B are diagrams illustrating the operational feeling variable means of the operation device according to the first embodiment of the present invention.
Figure 7B:
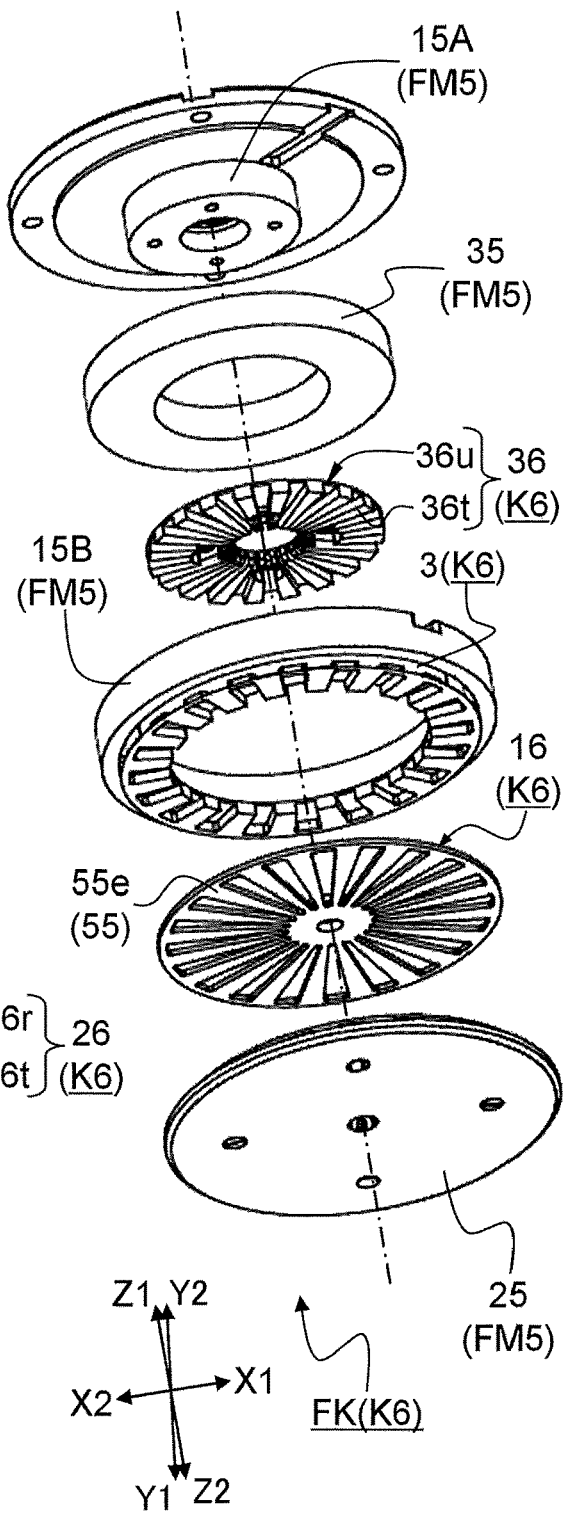

Next, the operational feeling variable means FK of the operation device 100 will be described. FIG. 5 is a cross-sectional view of the operational feeling variable means FK of the operation device 100 according to the first embodiment of the present invention, in which the P portion illustrated in FIG. 4 is enlarged. FIG. 6 is a diagram illustrating the operational feeling variable means FK, in which FIG. 6A is an upper perspective view of the operational feeling variable means FK, and FIG. 6B is a side view of the operational feeling variable means FK as viewed from the Y2 side illustrated in FIG. 6A. FIG. 7 is a diagram illustrating the operational feeling variable means FK of the operation device 100 according to the first embodiment of the present invention, in which FIG. 7A is an upward exploded perspective view viewed from the Z1 side illustrated in FIG. 6A, and FIG. 7B is a downward exploded perspective view viewed from the Z2 side illustrated in FIG. 6A.

As described above, the operational feeling variable means FK includes the movable load applying mechanism F5 for applying a variable load to the operation body 11 and the magnetic click mechanism K6 for applying a variable load to the operation body 11 by a magnetic force.

In the first embodiment of the present invention, the components of the movable load applying mechanism F5 of the operational feeling variable means FK and the components of the magnetic click mechanism K6 of the operational feeling variable means FK are used in common with each other, and, therefore, a detailed description of the movable load applying mechanism F5 of the operational feeling variable means FK is first given, and the magnetic click mechanism K6 is described by adding information to the description of the movable load applying mechanism F5. The components are in common with each other, and, therefore, miniaturization of the operation device 100 is achieved.

First, the movable load applying mechanism F5 of the operational feeling variable means FK will be described.

The movable load applying mechanism F5 of the operational feeling variable means FK includes the movable member 55 that moves (rotational motion) in engagement with the movable shaft 11j (the ring portion 11r) as illustrated in FIGS. 4 and 5, the magnetic generating mechanism FM5 that faces the movable member 55 by interposing a gap, and the magnetic viscous fluid 75 that is present in the gap, as illustrated in FIG. 5.

Further, the magnetic generating mechanism FM5 of the movable load applying mechanism F5 has an overall cylindrical shape as illustrated in FIG. 6A, and as illustrated in FIG. 5, the magnetic generating mechanism FM5 includes a coil (hereinafter, referred to as a first coil 35) that generates a magnetic field by being energized, the first yoke 15 that is disposed to surround the first coil 35, a second yoke 25 that faces the other side of the movable member 55 (the Z2 side illustrated in FIG. 4) by interposing a gap, and a control unit (not illustrated) that controls the energization of the first coil 35. The movable load applying mechanism F5 is configured to receive a rotation operation by the operator, and apply a load from the movable load applying mechanism F5 to the operation body 11, thereby applying a load (rotational load) of the operation portion (an operation knob or an operation finger grip, etc.) of the operation member 1 to the operator.

First, the magnetic generating mechanism FM5 of the movable load applying mechanism F5 will be described. The first coil 35 of the magnetic generating mechanism FM5 is formed in a ring-like shape by winding a metal wire material in an annular manner (see FIG. 2), and the first coil 35 is disposed on one side of the movable member 55 (on the Z1 side illustrated in FIG. 4) as illustrated in FIG. 4. Then, by energizing the first coil 35, a magnetic field is generated around the first coil 35. The first coil 35 has a shape in which a metal wire material is wound and bundled. In FIG. 2, however, the illustration is simplified to show a flat surface.

Next, the first yoke 15 of the magnetic generating mechanism FM5 is provided so as to surround the first coil 35 as illustrated in FIG. 4, and the first yoke 15 is configured to include the upper yoke 15A covering one side of the first coil 35 (the Z1 side illustrated in FIG. 4) and the inner sidewall of the first coil 35 (the center sidewall of the annular shape), a transverse yoke 15B covering the outer sidewall of the first coil 35 and a portion of the other side of the first coil 35 (the Z2 side illustrated in FIG. 4), and a lower yoke 15C covering a portion of the other side of the first coil 35.

The first yoke 15 is disposed on one side of the movable member 55 as illustrated in FIG. 5, and a portion of the transverse yoke 15B and the lower yoke 15C face the movable member 55 by interposing a gap (a first gap 5g, see FIG. 5). In the first gap 5g, which is the gap between the magnetic generating mechanism FM5 (the first yoke 15) and the movable member 55, there is the magnetic viscous fluid 75, which will be described later. The magnetic flux generated by the first coil 35 is confined by the first yoke 15, and the magnetic field is efficiently applied to the movable member 55 side.

Next, the second yoke 25 of the magnetic generating mechanism FM5 is formed in the shape of a disc as illustrated in FIG. 2, and is disposed on the other side of the movable member 55 as illustrated in FIG. 4, FIG. 5, and FIG. 6B, and the second yoke 25 faces the movable member 55 by interposing a gap (a second gap 5p, see FIG. 5). In the second gap 5p, which is the gap between the magnetic generating mechanism FM5 (the second yoke 25) and the movable member 55, there is the magnetic viscous fluid 75 to be described later.

As a result, the magnetic flux generated from the first coil 35 reliably passes from the first yoke 15 to the second yoke 25 and from the second yoke 25 to the first yoke 15. Therefore, a magnetic path is reliably formed in a direction (the Z direction perpendicular to the X-Y plane illustrated in FIG. 6B) perpendicular to the direction (the direction transverse to the X-Y plane illustrated in FIG. 6A) of rotational motion of the movable member 55. Thus, the magnetic field is applied to the magnetic viscous fluid 75 present in the gaps (the first gap 5g and the second gap 5p) between the magnetic generating mechanism FM5 and the movable member 55.

Further, the sidewall spacer S7 that forms part of the sidewall of the main body is provided between the outer peripheral side of the first yoke (the transverse yoke 15B) and the outer peripheral side of the second yoke 25. The sidewall spacer S7 is also formed using a synthetic resin such as polybutylene terephthalate resin (PBT) and divides the first yoke 15 (the transverse yoke 15B) and the second yoke 25 in a magnetic circuit.

Further, as illustrated in FIG. 4, the first yoke 15, the second yoke 25, and the sidewall spacer S7 form a narrow housing space in a direction (the direction of the X-Y plane) perpendicular to the direction (the Z direction illustrated in FIG. 4) along the movable shaft 11j of the operation body 11. The movable member 55 of the movable load applying mechanism F5 is disposed in this narrow housing space.

Next, the control unit of the magnetic generating mechanism FM5 uses an integrated circuit (IC) to control the amount of power supplied to the first coil 35, the timing of energizing the first coil 35, and the like. Specifically, for example, when a rotation operation is performed by an operator, the control unit receives a detection signal from a position detecting means that detects an operation position of the operation body 11. Then, the control unit supplies a certain amount of current to the first coil 35 or changes the current amount according to the operation position of the operation body 11.

The control unit is also mounted on a circuit board (not illustrated) and is electrically connected to the first coil 35. The control unit and the circuit board are suitably disposed near the magnetic generating mechanism FM5, but are not limited thereto. For example, the control unit may be connected to the first coil 35 by a flexible printed circuit board (FPC), etc., and may be mounted on a motherboard of a product that is the target of application.

Next, the movable member 55 of the movable load applying mechanism F5 will be described. The movable member 55 is formed of a soft magnetic body, such as iron, and as illustrated in FIG. 7, the movable member 55 is configured with a base portion 55d having a through hole centered on the rotation center (axis center) of the movable shaft 11j, and a disc portion 55e integrally formed with the base portion 55d and having a disc shape centered on a rotation center.

The base portion 55d of the movable member 55 engages with the movable shaft 11j of the operation body 11 on the lower side of the ring portion 11r of the operation body 11, as illustrated in FIG. 4. Accordingly, the disc portion 55e of the movable member 55 rotates in both directions in accordance with the rotational motion in both directions of the operation body 11.

The disc portion 55e of the movable member 55 is provided with a plurality of through holes 55h (20 through holes in the first embodiment of the present invention) having an elongated fan-shape. The through holes 55h are radially arranged in a regular manner with fan-shaped circumferential portions facing the outer circumference, about the rotation center (the axis center of the movable shaft 11j).

When the operation device 100 is assembled, the disc portion 55e is housed in a narrow housing space formed by the first yoke 15, the second yoke 25, and the sidewall spacer S7 described above, as illustrated in FIG. 4. Accordingly, the magnetic flux generated from the first coil 35 reliably passes from the first yoke 15 to the movable member 55, from the movable member 55 to the second yoke 25, from the second yoke 25 to the movable member 55, and from the movable member 55 to the first yoke 15. Therefore, a magnetic path is reliably formed in a direction perpendicular to the direction of rotational motion of the movable member 55.

Figure 8A:
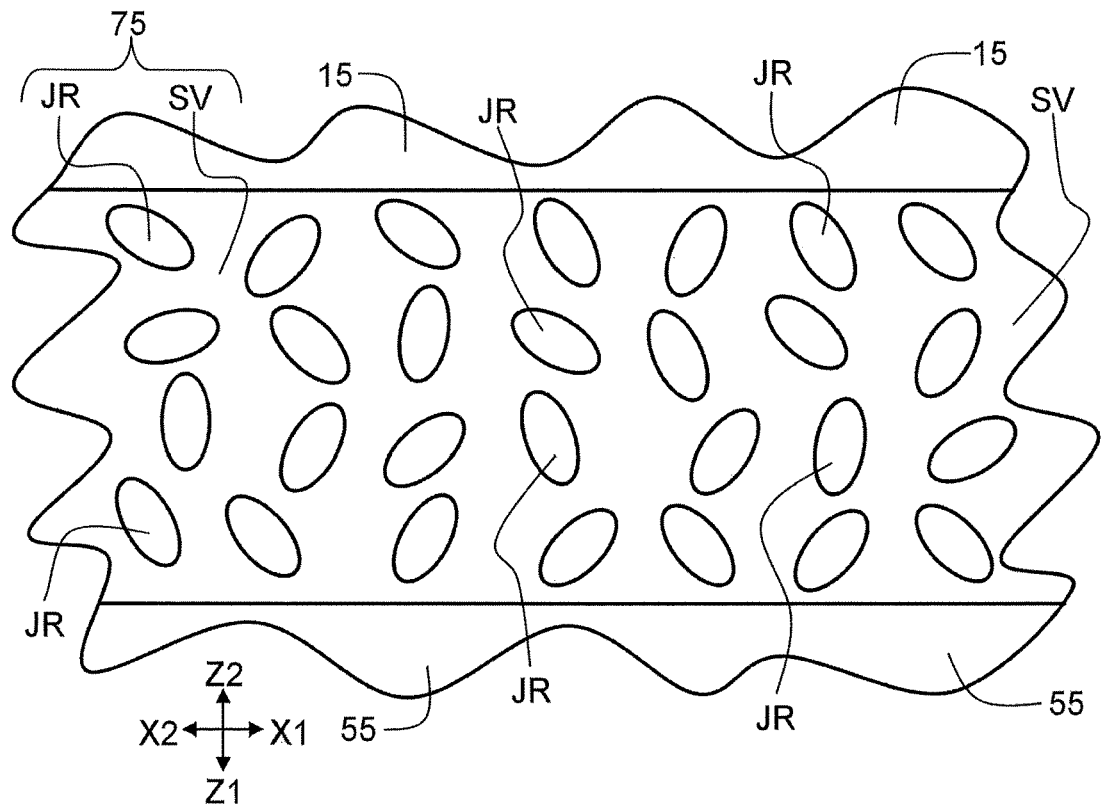
FIGS. 8A and 8B are schematic diagrams illustrating a magnetic viscous fluid of the operation device according to the first embodiment of the present invention.
Figure 8B:
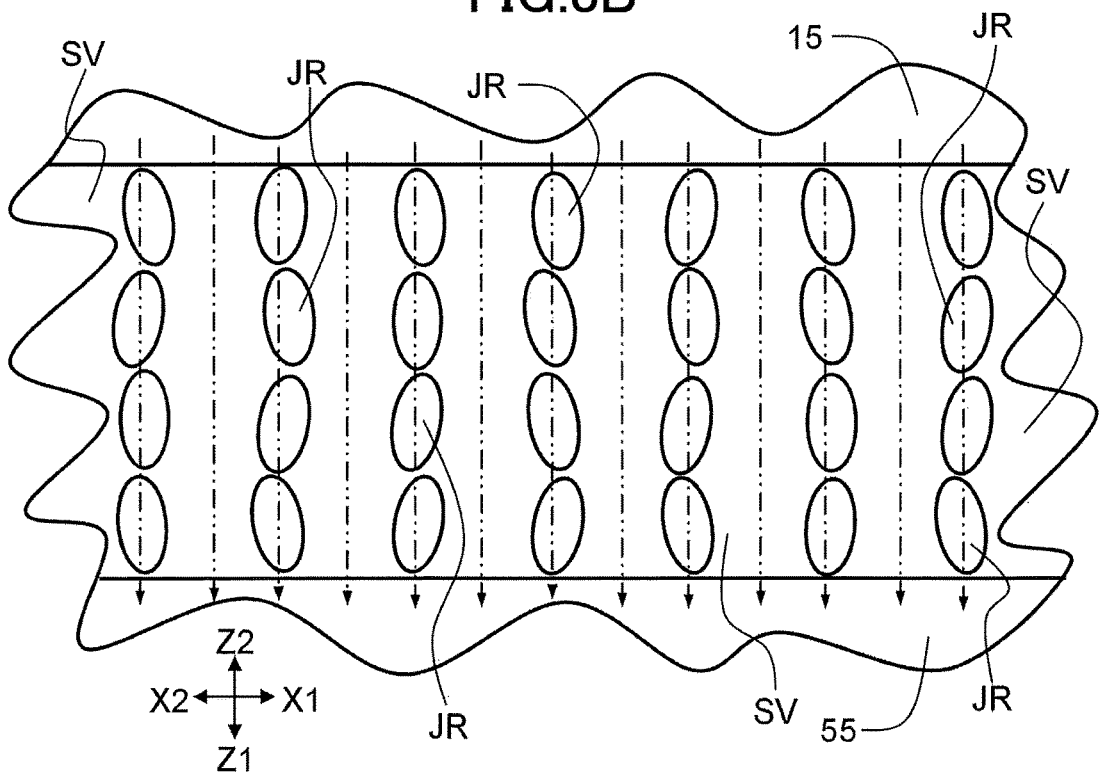

Finally, the magnetic viscous fluid 75 of the movable load applying mechanism F5 will be described. FIG. 8 is a schematic diagram illustrating the magnetic viscous fluid 75, wherein FIG. 8A is a diagram illustrating the magnetic viscous fluid 75 in which a magnetic field is not applied, and FIG. 8B is a diagram illustrating the magnetic viscous fluid 75 in which a magnetic field is applied. In FIG. 8B, the flow of the magnetic field (magnetic flux) is indicated by two-dot chain lines in order to make the explanation easier to understand.

As illustrated in FIG. 8A, the magnetic viscous fluid 75 is a material in which fine magnetic particles JR, such as iron or ferrite, are dispersed in a solute SV of a synthetic resin, such as a silicone resin, and is commonly referred to as an MR fluid (Magneto Rheological Fluid). The magnetic viscous fluid 75 has a property that the viscosity varies according to the strength of the magnetic field, and is distinguished from a similar magnetic fluid. The large difference between both forms (a magneto rheological fluid and a magnetic fluid) is the particle size of the powder. The particle size of the powder of the MR fluid is approximately 1 μm to 1 mm, whereas the particle size of the powder of a magnetic fluid is approximately 10 nm to 1 μm, such that the particle size of the powder of the MR fluid is approximately 100 to 1000 times larger than that of the magnetic fluid.

Here, the "varying viscosity according to the strength of the magnetic field" in the magnetic viscous fluid 75 will be briefly described. First, if a magnetic field is not applied to the magnetic viscous fluid 75, the magnetic particles JR are dispersed irregularly in the solute SV, as illustrated in FIG. 8A. In this case, for example, when the movable member 55 moves (rotational motion) (rotates in a plane (X-Y plane) perpendicular to the Z direction illustrated in FIG. 8A), the movable member 55 easily moves while receiving relatively low resistance.

Next, when a current is supplied to the first coil 35 of the magnetic generating mechanism FM5 and a magnetic field is generated, the magnetic particles JR are regularly aligned in a straight-chain along the magnetic field acting on the magnetic viscous fluid 75 (in FIG. 8B, along the Z-direction) as illustrated in FIG. 8B. The degree of regularity varies depending on the strength of the magnetic field. That is, the stronger the magnetic field acting on the magnetic viscous fluid 75, the greater the degree of regularity. Thus, a stronger shear force is applied with respect to the direction in which the regularity of the straight-chain aligned magnetic particles JR is disrupted, resulting in a strong viscosity with respect to this direction. In particular, the highest shear force is applied in the direction perpendicular to the applied magnetic field (the X-Y plane direction in FIG. 8B).

When the movable member 55 moves in such an energized state (in the state as illustrated in FIG. 8B), a resistance force is generated against the movable member 55, and this resistance force (load) is transmitted to the operation body 11 engaged with the movable member 55. Accordingly, the movable load applying mechanism F5 can apply a load of the movable operation (rotational operation) to the operator. In this case, the control unit controls the amount power supplied to the first coil 35 and the timing of energizing, and, therefore, it is possible to freely apply any load to the operator at any timing.

Figure 9:
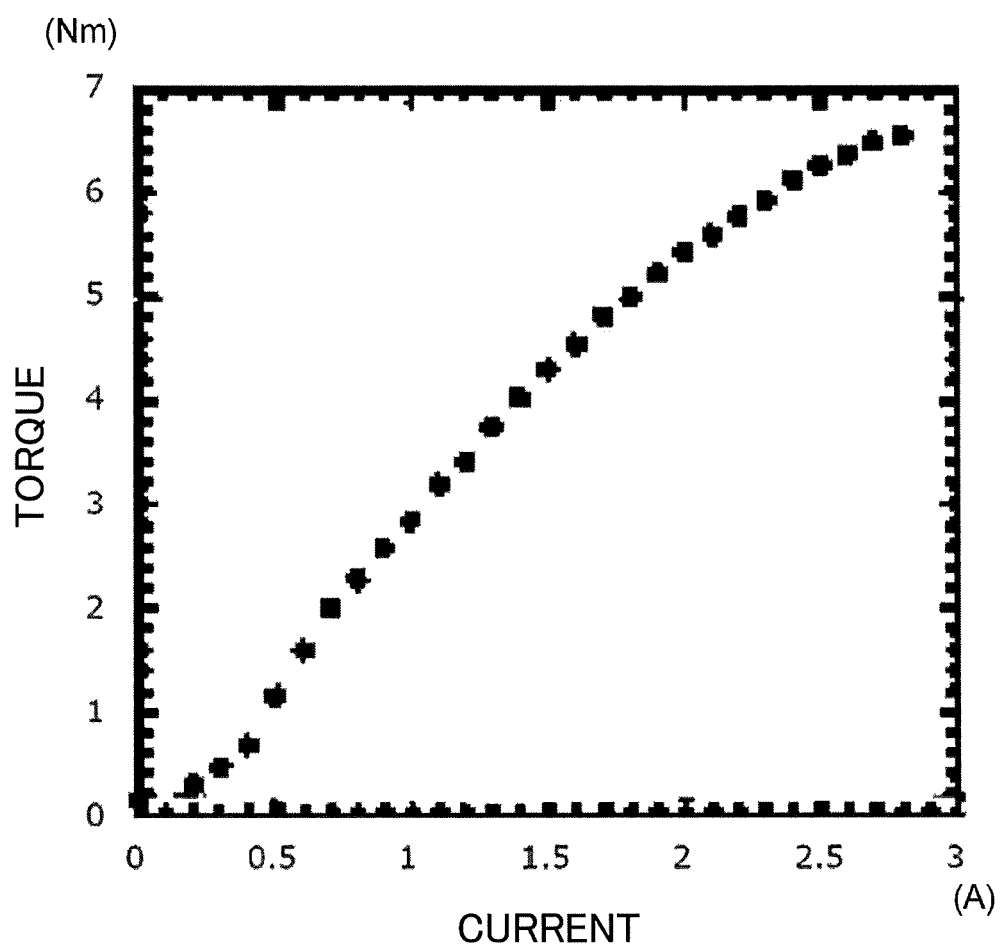
FIG. 9 is a diagram illustrating a movable load applying mechanism of the operation device according to the first embodiment of the present invention, and is a graph representing an example of a relationship between a current supplied to a magnetic generating mechanism and a torque applied to the operation body.

FIG. 9 illustrates the results of verification that "the resistance force (load) increases according to the strength of the magnetic field". FIG. 9 is a graph illustrating an example of the relationship between the current supplied for energizing the first coil 35 of the magnetic generating mechanism FM5 and the torque applied to the operation body 11. The horizontal axis indicates the current (A) and the vertical axis indicates the torque (Nm). This torque corresponds to the resistance (load) applied to the operation body 11. As illustrated in FIG. 9, when the current supplied for energizing the first coil 35 of the magnetic generating mechanism FM5 is increased, the magnetic field generated accordingly becomes stronger, and the torque, i.e., the resistance (load) applied to the operation body 11, increases in accordance with the strength of the magnetic field. In this manner, a variable load can be applied to the operation body 11 (the operation member 1) by utilizing the fact that "the viscosity changes according to the strength of the magnetic field and the resistance becomes stronger" in the magnetic viscous fluid 75.

In the first embodiment of the present invention, the magnetic viscous fluid 75 having the characteristics described above is suitably used. That is, as illustrated in FIGS. 4 and 5, the magnetic viscous fluid 75 is filled into the first gap 5g between the first yoke 15 and the movable member 55. Accordingly, the magnetic viscous fluid 75 causes a load on the movable member 55 moving in a direction (rotational direction) that is transverse to the magnetic flux formed from the first yoke 15 to the movable member 55 and from the movable member 55 to the first yoke 15. Accordingly, a load is applied on the operation body 11 through the movable member 55 and the movable shaft 11j. Thus, it is possible to provide the operation device 100 that provides a good operational feeling.

Furthermore, in the first embodiment of the present invention, as illustrated in FIGS. 4 and 5, the magnetic viscous fluid 75 is also filled in the second gap 5p, which is the gap between the movable member 55 and the second yoke 25. The magnetic viscous fluid 75 filled herein is also affected by a magnetic flux formed from the first yoke 15 to the second yoke 25 via the movable member 55 and from the second yoke 25 to the first yoke 15 via the movable member 55. Therefore, the magnetic particles JR can be aligned in a direction (virtual vertical cross-sectional direction) perpendicular to a direction (rotational direction) in which the movable member 55 moves, and a stronger load can be applied. In this way, additional loads can be applied, and even for a same magnetic field, a greater operational feeling can be provided to the operator.

Next, the magnetic click mechanism K6 of the operational feeling variable means FK will be described.

The magnetic click mechanism K6 of the operational feeling variable means FK is configured as illustrated in FIG. 2. The magnetic click mechanism K6 includes the first magnetic body 16 that moves in an interlocked manner with the motion of the operation body 11, the second magnetic body 26 disposed facing the first magnetic body 16, and the third magnetic body 36 disposed facing the second magnetic body 26 by interposing the first magnetic body 16. Specifically, the movable member 55 of the movable load applying mechanism F5 formed of a soft magnetic body is used as the first magnetic body 16 that moves in an interlocked manner with the motion (rotational motion) of the operation body 11. The second magnetic body 26 is formed integrally with the second yoke 25 of the magnetic generating mechanism FM5 of the movable load applying mechanism F5, and the third magnetic body 36 is formed integrally with the first yoke 15 of the magnetic generating mechanism FM5 of the movable load applying mechanism F5. The third magnetic body 36 is formed by being separated into the transverse yoke 15B and the lower yoke 15C of the first yoke 15.

The first magnetic body 16 is magnetized by a magnetic field generated by energizing the first coil 35 of the magnetic generating mechanism FM5. Accordingly, the magnetic generating mechanism FM5 also has the function of magnetizing the first magnetic body 16 of the magnetic click mechanism K6, and, therefore, another magnetizing mechanism used only for magnetizing the first magnetic body 16 is not required, so that space saving is achieved, and the operation device 100 can be manufactured at lower cost.

Further, in the first embodiment of the present invention, the movable member 55 that moves in an interlocked manner with the motion (rotational motion) of the operation body 11 is the first magnetic body 16, and, therefore, the first magnetic body 16 is disposed on the movable shaft 11*j*. Thus, a load from the movable load applying mechanism F5 and a load from the magnetic click mechanism K6 can be applied to the same movable shaft 11*j*, and a load can be applied to the operation body 11 in a balanced and efficient manner.

In addition, plural protruding portions 26*t* having an elongated fan shape are formed side by side in the second magnetic body 26 on the surface facing the first magnetic body 16, along the direction (rotational direction) of the motion of the operation body 11, and a recessed portion 26*r* is formed between two adjacent protruding portions 26*t*. In other words, the plurality of protruding portions 26*t* are radially arranged in a regular manner with the fan-shaped arc portion facing the outer circumference, about the rotation center (the axis center of the movable shaft 11*j*) of the movable member 55, with the recessed portions 26*r* arranged between the respective protruding portions 26*t*. The arrangement of the plurality of protruding portions 26*t* corresponds to the plurality of through holes 55*h* of the movable member 55. In the first embodiment of the present invention, 20 protruding portions 26*t* are formed, of which four portions are partially connected, and the shapes of the recessed portions 26*r* are partially different.

The second magnetic body 26 is magnetized such that different magnetic poles alternate along the direction of movement of the operation body 11, and, therefore, a change occurs in the attraction state or the repulsion state with respect to the opposing first magnetic body 16, that is, the movable member 55 having the plurality of through holes 55*h*. Accordingly, in accordance with the motion of the operation body 11, the first magnetic body 16 (the movable member 55) and the second magnetic body 26 are repeatedly subjected to attraction and repulsion. Therefore, a positive load and a negative load can be applied to the operation body 11.

Further, in the first embodiment of the present invention, the plurality of protruding portions 26*t* and the plurality of recessed portions 26*r* are magnetized such that different magnetic poles alternate, and, therefore, the first magnetic body 16 and the second magnetic body 26 are clearly repeatedly subjected to attraction and repulsion. Accordingly, a positive load and a negative load can be easily applied to the operation body 11, and the magnetic click mechanism K6 can be easily provided.

In the current supplied for energizing the first coil 35, the magnetization state of the first magnetic body 16 is changed by controlling the alternating interval of switching ON/OFF the energization in the case of a direct current, or by controlling the frequency in the case of an alternating current, to be a value obtained by multiplying a reciprocal of an integer with an alternating interval of the protruding portions 26*t* and the recessed portions 26*r*. This allows easy control of the click feeling of the magnetic click mechanism K6. For example, by providing protrusions and recesses at fine intervals, and setting the period in which a magnetic field is generated, for example, to an interval skipping one protruding portion 26*t*, a fine click feeling and a rough click feeling can be applied.

In the first embodiment of the present invention, similar to the second magnetic body 26, plural protruding portions 36*t* having an elongated fan shape are formed side by side in the third magnetic body 36 on the surface facing the first magnetic body 16, along the movement direction (rotational direction) of the operation body 11, and a recessed portion 36*u* is provided between two adjacent protruding portions 36*t*. The plurality of protruding portions 36*t* and the plurality of recessed portions 36*u* are magnetized such that different magnetic poles alternate. Accordingly, the first magnetic body 16 and the third magnetic body 36 are also repeatedly subjected to attraction and repulsion, thereby further applying a positive load and a negative load to the operation body 11. This allows a better click feeling to be provided to the operator in accordance with the operator's operation.

As described above, by combining the movable load applying mechanism F5 with the magnetic click mechanism K6, the operation body 11 can be subjected to a stronger load and a sudden load reduction. This allows a good click feeling to be given to the operator in accordance with the operator's operation.

Finally, the effects of the operation device 100 according to the first embodiment of the present invention will be described below.

The operation device 100 according to the first embodiment of the present invention has a configuration in which the first yoke 15 is disposed on one side of the movable member 55 and the magnetic viscous fluid 75 is filled in the first gap 5*g* between the first yoke 15 and the movable member 55. Accordingly, a magnetic field is generated by energizing the first coil 35, and a magnetic path is formed to spread from the first yoke 15 to the movable member 55, so that the magnetic particles JR in the magnetic viscous fluid 75 are aligned along the magnetic flux. Thus, a load is applied from the magnetic viscous fluid 75 to the movable member 55 that moves in a direction that traverses the magnetic flux formed between the first yoke 15 and the movable member 55, and a load is applied to the operation body 11 via the movable member 55 and the movable shaft 11*j*.

On the other hand, the second magnetic body 26, which is disposed facing the first magnetic body 16 that moves in an interlocked manner with the motion of the operation body 11, is magnetized such that different magnetic poles alternate, so that the first magnetic body 16 and the second magnetic body 26 are repeatedly subjected to attraction and repulsion in accordance with the motion of the operation body 11. Therefore, a positive load and a negative load can be applied to the operation body 11.

Accordingly, by combining the movable load applying mechanism F5 and the magnetic click mechanism K6, a stronger load and a sudden load reduction can be applied to the operation body 11. This allows a good click feeling to be given to the operator in accordance with the operator's operation.

The first magnetic body 16 is magnetized by the first coil 35, and, therefore, the magnetic generating mechanism FM5 also has the function of magnetizing the first magnetic body 16 of the magnetic click mechanism K6. Therefore, another magnetization mechanism used only to magnetize the first magnetic body 16 is not required. Accordingly, space saving is achieved, and the operation device 100 can be manufactured at lower cost.

In addition, the current supplied for energizing the first coil 35 is controlled such that the alternating interval of switching ON/OFF the energization in the case of a direct current, or the frequency in the case of an alternating current, is to be a value obtained by multiplying a reciprocal of an integer with an alternating interval of the protruding portions 26t and the recessed portions 26r, thereby allowing easy control of the click feeling of the magnetic click mechanism K6.

In addition, the movable member 55 is formed of a soft magnetic body, and, therefore, a magnetic path is reliably formed from the first yoke 15 to the movable member 55, and from the movable member 55 to the first yoke 15, so that the magnetic particles JR in the magnetic viscous fluid 75 are aligned in a direction extending between opposite surfaces facing each other. Therefore, a stronger load is applied to the movable member 55 that moves in a direction traversing the direction extending between opposite surfaces facing each other in which the magnetic particles JR are aligned. Accordingly, a stronger load is applied on the operation body 11 via the movable member 55 and the movable shaft 11j, thereby providing a better operational feeling to the operator.

Also, the second yoke 25 is disposed facing the other side of the movable member 55, and, therefore, the magnetic particles JR can be aligned in a direction perpendicular to the direction of movement of the movable member 55, and a stronger load can be applied. Further, the magnetic viscous fluid 75 is filled in the second gap 5p between the second yoke 25 and the inner circumferential surface of the movable member 55, and, therefore, additional load can be applied to the movable member 55 that moves in a direction traversing the magnetic flux. In this way, even for a same magnetic field, a greater operational feeling can be provided to the operator.

Further, the movable member 55 is formed of a soft magnetic body, and, therefore, a magnetic path is reliably formed from the first yoke 15 to the second yoke 25 via the movable member 55, and from the second yoke 25 to the first yoke 15 via the movable member 55. Accordingly, the magnetic particles JR in the magnetic viscous fluid 75 disposed in the gap are reliably aligned in a direction extending between opposite surfaces facing each other.

Further, the first magnetic body 16 is disposed on the movable shaft 11j, and, therefore, a load from the movable load applying mechanism F5 and a load from the magnetic click mechanism K6 can be applied to the same movable shaft 11j, and a load can be applied to the operation body 11 in a balanced and efficient manner.

Second Embodiment

Figure 10:
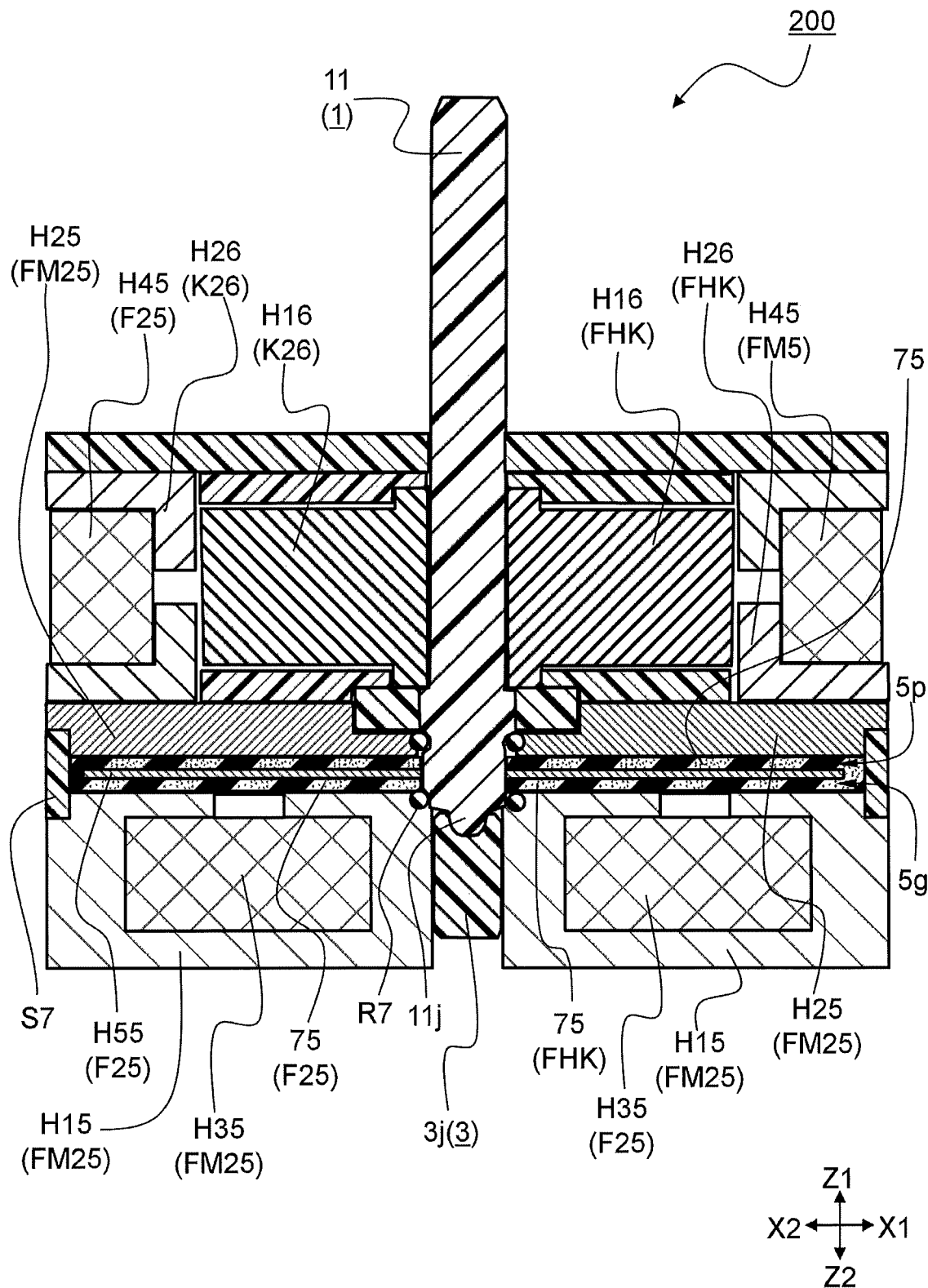
FIG. 10 is a vertical sectional view of an operation device according to a second embodiment of the present invention.
Figure 11:
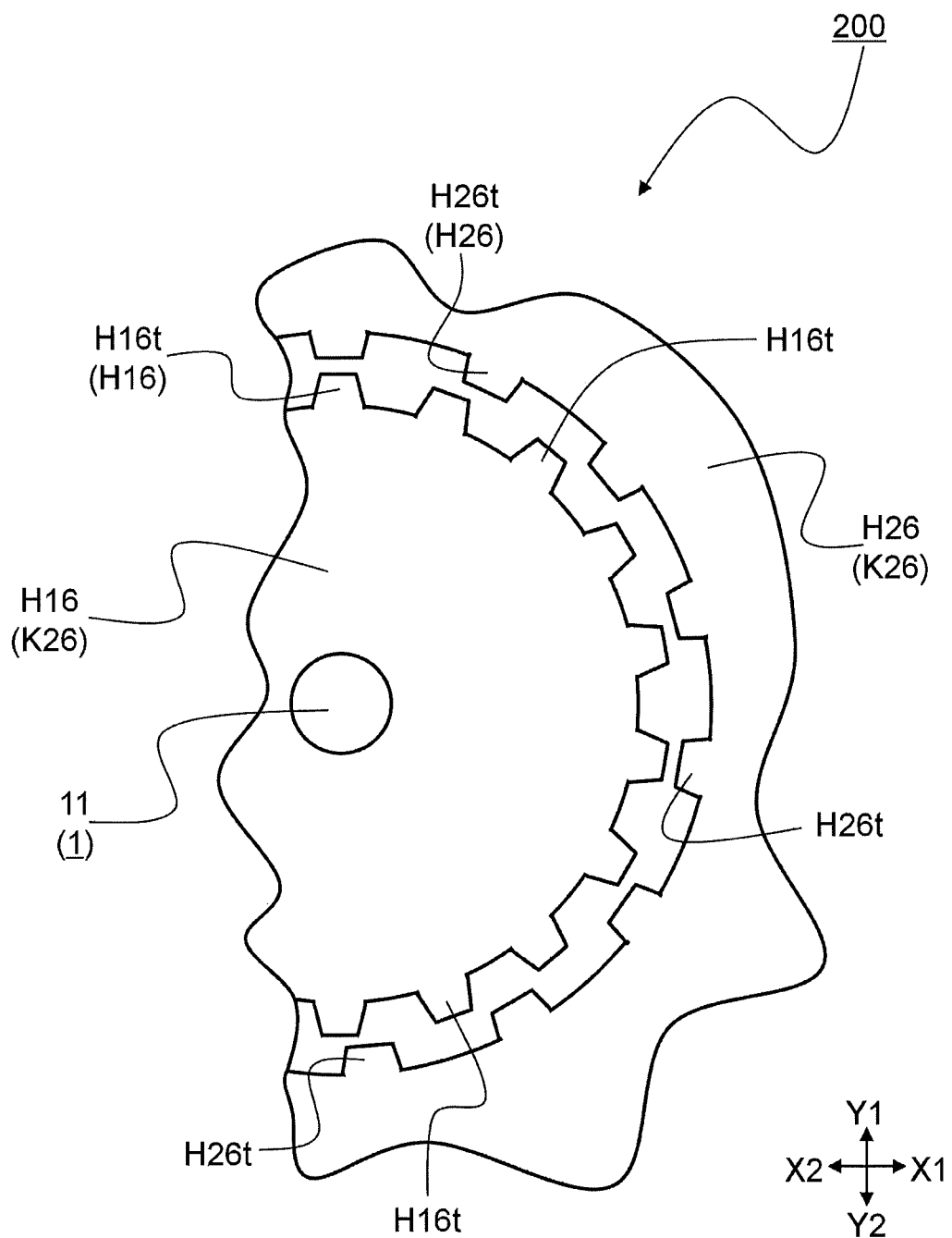
FIG. 11 is a schematic diagram illustrating the operation device according to the second embodiment of the present invention, and is a plan view of a portion in which the first magnetic body and the second magnetic body are facing each other.
Figure 12:
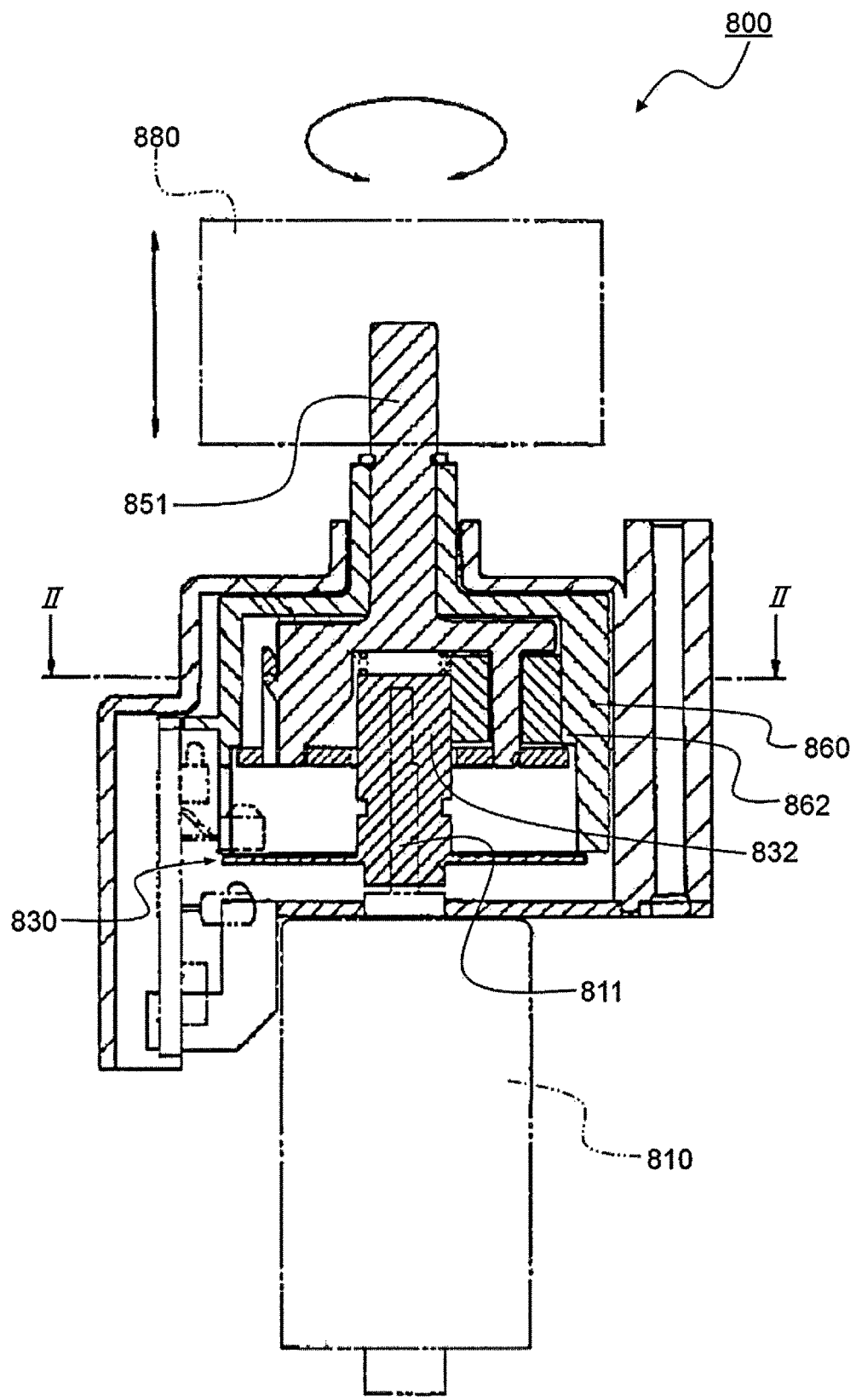
FIG. 12 is a vertical cross-sectional view of a main part of a basic configuration of a manual input device according to a conventional example 1.
Figure 13:
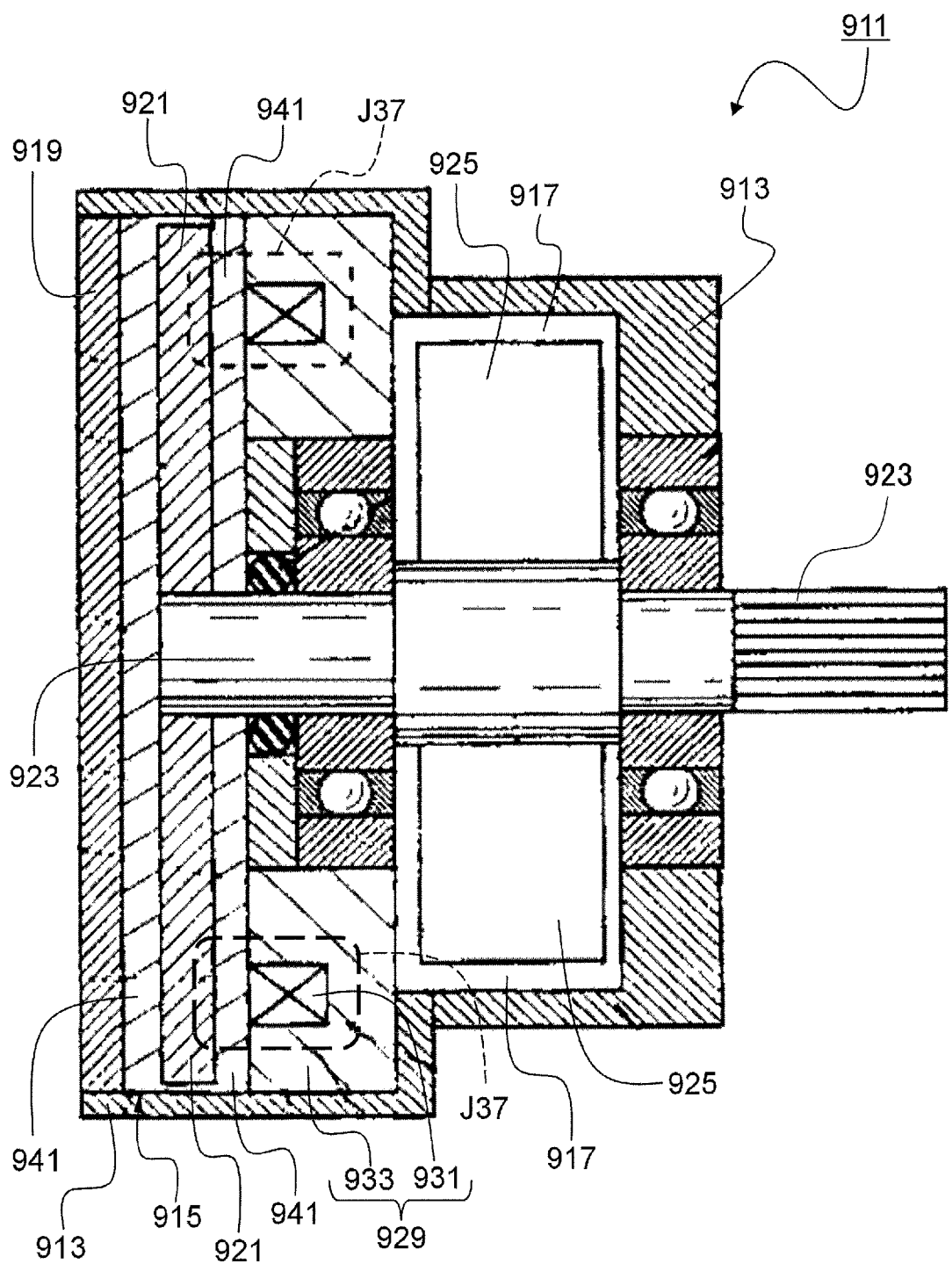
FIG. 13 is a vertical cross-sectional view of a manual brake according to a conventional example 2.

FIG. 10 is a configuration diagram illustrating a vertical cross-section of an operation device 200 according to a second embodiment of the present invention. FIG. 11 is a schematic diagram illustrating the operation device 200 according to the second embodiment of the present invention, and is a plan view of a portion in which a first magnetic body H16 and a second magnetic body H26 are facing each other. In addition, the operation device 200 according to the second embodiment differs from the first embodiment, mainly in the configuration of a magnetic click mechanism K26.

The operation device 200 according to the second embodiment of the present invention has an exterior appearance similar to that of the operation device 100 according to the first embodiment, and as illustrated in FIG. 10, the operation device 200 is mainly configured with the operation member 1 having the operation body 11 that moves in the operation direction of an operation by the operator, the support body 3 that freely supports the motion of the operation body 11, and an operational feeling variable means FHK that can vary the operational feeling that is felt by the operator. In addition, the operational feeling variable means FHK includes a movable load applying mechanism F25 for applying a load to the operation body 11 and the magnetic click mechanism K26 for applying a variable load to the operation body 11 by a magnetic force.

The movable load applying mechanism F25 includes a movable member H55 that moves in engagement with the operation body 11, a magnetic generating mechanism FM25 facing the movable member H55 by interposing a gap, and the magnetic viscous fluid 75 present in the gap, as illustrated in FIG. 10. The magnetic click mechanism K26 is configured with the first magnetic body H16 that moves in an interlocked manner with the motion of the operation body 11, and a second magnetic body H26 disposed facing the first magnetic body H16.

Further, in the operation device 200 of the second embodiment, in addition to the above-described components, the operation device 200 includes the sidewall spacer S7 having a ring shape and forming the outer shape, similar to that of the first embodiment. In the operation device 200, an operation portion (an operation knob or an operation finger grip, etc.) of the operation member 1 (not illustrated) is engaged to one end side of the operation body 11, and the operation portion is grasped and operated by an operator, so that the operation body 11 rotates in both directions.

Hereinafter, the description of the operation member 1, the support body 3, and the magnetic viscous fluid 75 of the operation device 200 is omitted. Further, with regard to the operational feeling variable means FHK of the operation device 200, descriptions of parts similar to those of the first embodiment will be omitted, and different configurations will mainly be described.

The operational feeling variable means FHK of the operation device 200 includes the movable load applying mechanism F25 for applying a load to the operation body 11 and the magnetic click mechanism K26 for applying a variable load to the operation body 11 by a magnetic force.

First, the movable load applying mechanism F25 of the operational feeling variable means FHK will be described.

The movable load applying mechanism F25 of the operational feeling variable means FHK includes the movable member H55 that moves in engagement with the movable shaft 11j (rotational motion), the magnetic generation mechanism FM25 that faces the movable member H55 by interposing a gap, and the magnetic viscous fluid 75 that is present in the gap, as illustrated in FIG. 10.

First, the movable member H55 of the movable load applying mechanism F25 is formed of a soft magnetic body, such as iron, as in the first embodiment; however, unlike the first embodiment, the movable member H55 is formed in a disc shape without any of the through holes 55h, although not illustrated in detail. As illustrated in FIG. 10, the movable member H55 is engaged with the movable shaft 11j of the operation body 11, and the movable member H55 rotates in both directions about the rotation center (the axis center of the movable shaft 11j) in accordance with the rotational motion of the operation body 11 in both directions.

Next, the magnetic generating mechanism FM25 of the movable load applying mechanism F25 includes a coil (hereinafter, referred to as a first coil H35) that generates a magnetic field by being energized, a first yoke H15 that is disposed to surround the first coil H35, a second yoke H25 that faces the other side of the movable member H55 by interposing a gap, and a control unit (not illustrated) that controls the energization of the first coil H35, as illustrated in FIG. 10. The movable load applying mechanism F25 is configured to receive a rotational operation by the operator, and apply a load (rotational load) to the operation portion (an operation knob or an operation finger grip, etc.) of the operation member 1 with respect to the operator, by applying a load to the operation body 11 from the movable load applying mechanism F25.

As illustrated in FIG. 10, the first coil H35 of the magnetic generation mechanism FM25 is formed in a ring-like shape by circularly winding a metal wire material in the same manner as in the first embodiment. In addition, the first yoke H15 of the magnetic generating mechanism FM25 is disposed to surround the first coil H35 in the same manner as the first embodiment, and faces the movable member H55 by interposing a gap (the first gap 5g). The first coil H35 and the first yoke H15 are disposed on one side of the movable member H55 (the Z2 side illustrated in FIG. 10) as illustrated in FIG. 10.

Further, as illustrated in FIG. 10, the second yoke H25 of the magnetic generating mechanism FM25 is disposed on the other side of the movable member H55 (the Z1 side illustrated in FIG. 10) and faces the movable member H55 by interposing a gap (the second gap 5p), similar to the first embodiment. The magnetic viscous fluid 75 is present in the gaps (the first gap 5g and the second gap 5p) between the magnetic generating mechanism FM25 (the first yoke H15 and the second yoke H25) and the movable member H55.

Then, by energizing the first coil H35, a magnetic field is generated around the first coil H35, and the magnetic flux generated from the first coil H35 is confined by the first yoke H15, thereby efficiently applying a magnetic field on the side of the movable member H55. Further, the second yoke H25 is disposed facing the other side of the movable member H55, and, therefore, the magnetic flux generated from the first coil H35 reliably passes from the first yoke H15 to the movable member H55, from the movable member H55 to the second yoke H25, from the second yoke H25 to the movable member H55, and from the movable member H55 to the first yoke H15. Therefore, a magnetic path is reliably formed in a direction perpendicular to the direction of rotational motion of the movable member H55.

According to the above configuration, the magnetic path is reliably formed in a direction (the Z direction illustrated in FIG. 10) perpendicular to the rotational direction of the movable member H55, and, therefore, a magnetic field is reliably applied to the magnetic viscous fluid 75 present in the gaps (the first gap 5g and the second gap 5p) between the magnetic generation mechanism FM25 and the movable member H55. Accordingly, a load is applied to the operation body 11 via the movable member H55 and the movable shaft 11j, thereby providing the operation device 200 that provides a good operational feeling.

Next, the magnetic click mechanism K26 of the operational feeling variable means FHK will be described.

The magnetic click mechanism K26 of the operational feeling variable means FHK includes a coil (hereinafter, referred to as a second coil H45) that generates a magnetic field by being energized, a control unit (not illustrated) that controls the energization of the second coil H45, the first magnetic body H16 that moves in an interlocked manner with the motion of the operation body 11, and the second magnetic body H26 that is disposed facing the first magnetic body H16, as illustrated in FIG. 10. Unlike the first embodiment, the magnetic click mechanism K26 is not used in common with the components of the movable load applying mechanism F25 of the operational feeling variable means FHK.

First, the second coil H45 of the magnetic click mechanism K26 is formed in a ring-like shape by winding a metal wire material in an annular manner, as in the first embodiment. Then, the first magnetic body H16 and a portion of the second magnetic body H26 are disposed on the inner circumferential side of the ring shape.

Next, the first magnetic body H16 of the magnetic click mechanism K26 uses a permanent magnet, such as a samarium cobalt magnet, and is formed in a disc-like shape with a through hole in the center, although not illustrated in detail. In the second embodiment of the present invention, the operation body 11 is inserted in this through hole, so that the operation body 11 and the first magnetic body H16 are engaged with each other.

Accordingly, the first magnetic body H16 rotates in both directions about the rotation center (the axis center of the movable shaft 11j) in accordance with the rotational motion of the operation body 11 in both directions. Therefore, a load from the movable load applying mechanism F25 and a load from the magnetic click mechanism K26 can be applied to the same movable shaft 11j, and a load can be applied to the operation body 11 in a balanced and efficient manner.

In the second embodiment of the present invention, the first magnetic body H16 is disposed on the other side of the movable member H55 (the Z1 side illustrated in FIG. 10). This allows thinning of shape in the thickness direction. Further, the load from the movable load applying mechanism F25 and the load from the magnetic click mechanism K26 can be applied to the same movable member H55, and the load can be applied to the operation body 11 in a balanced and efficient manner.

Further, on the outer circumferential side of the first magnetic body H16, as illustrated in FIG. 11, plural protruding portions H16t are formed so as to protrude outward (radially) and are arranged side by side in a regular manner along the movement direction of the operation body 11, that is, along the circumferential direction. The plural protruding portions H16t are respectively magnetized such that different magnetic poles are alternated, along the movement direction of the operation body 11.

Next, the second magnetic body H26 of the magnetic click mechanism K26 is formed of a soft magnetic body such as iron and is disposed to surround the three sides of the second coil H45. That is, the second magnetic body H26 is disposed so as to surround the upper side of the second coil H45 (the Z1 side illustrated in FIG. 10), the lower side of the second coil H45 (the Z2 side illustrated in FIG. 10), and the inner side of the second coil H45 facing the movable shaft 11j of the operation body 11.

Further, the second magnetic body H26 is disposed facing the outer circumference of the first magnetic body H16 as illustrated in FIGS. 10 and 11. The second magnetic body H26 is magnetized by a magnetic field generated by energizing the second coil H45. Accordingly, the magnetic generating mechanism FM25 also has the function of magnetizing the second magnetic body H26 of the magnetic click mechanism K26, and, therefore, another magnetizing mechanism used only for magnetizing the second magnetic body H26 is not required. Accordingly, space saving is achieved, and the operation device 200 can be manufactured at lower cost.

In addition, as illustrated in FIG. 11, plural protruding portions H26t are formed side by side in the second magnetic body H26 on the surface facing the first magnetic body H16, i.e., on the inner circumferential surface side, along the movement direction (rotational direction) of the operation body 11.

The control unit of the magnetic click mechanism K26 controls the amount of power supplied to the second coil H45, the timing of the energization, and the like. This causes a change in the attraction state or the repulsion state of the first magnetic body H16 and the second magnetic body H26 facing each other. In accordance with the motion of the operation body 11, the first magnetic body H16 and the second magnetic body H26 are repeatedly subjected to attraction and repulsion. Therefore, a positive load and a negative load can be applied to the operation body 11.

In the second embodiment of the present invention, the first magnetic body H16 includes the plural protruding portions H16t that are respectively magnetized such that different magnetic poles are alternated along the movement direction of the operation body 11, and the second magnetic body H26 includes a plurality of the protruding portions H26t facing the plurality of protruding portions H16t. Accordingly, the case where the protruding portions H16t and the protruding portions H26t approach each other and the case where the protruding portions H16t and the protruding portions H26t separate from each other are clearly different, such that changes in the attraction state or the repulsion state between the first magnetic body H16 and the second magnetic body H26 are clearly evident. Accordingly, the first magnetic body H16 and the second magnetic body H26 are repeatedly subjected to attraction and repulsion, so that a positive load and a negative load can be clearly applied to the operation body 11, and the magnetic click mechanism K26 can be clearly provided. This makes it easier for a good click feeling to be provided to the operator in accordance with the operator's operation.

As described above, by combining the movable load applying mechanism F25 with the magnetic click mechanism K26, a stronger load and a sudden load reduction can be applied to the operation body 11. This allows a good click feeling to be given to the operator in accordance with the operator's operation.

Finally, the effects of the operation device 200 according to the second embodiment of the present invention will be described below.

The operation device 200 according to the second embodiment of the present invention has a configuration in which the first yoke H15 is disposed on one side of the movable member H55, and the magnetic viscous fluid 75 is filled in the first gap 5g between the first yoke H15 and the movable member H55. Accordingly, a magnetic field is generated by energizing the first coil H35, and a magnetic path is formed to spread from the first yoke H15 to the movable member H55, so that the magnetic particles JR in the magnetic viscous fluid 75 align along the magnetic flux. Accordingly, a load is applied from the magnetic viscous fluid 75 to the movable member H55 that moves in a direction that traverses the magnetic flux formed between the first yoke H15 and the movable member H55, and the load is applied to the operation body 11 via the movable member H55 and the movable shaft 11j.

On the other hand, both the first magnetic body H16 that moves in an interlocked manner with the motion of the operation body 11, and the second magnetic body H26 that is disposed facing the first magnetic body H16, are magnetized such that different magnetic poles alternate, and, therefore, the first magnetic body H16 and the second magnetic body H26 are repeatedly subjected to attraction and repulsion in accordance with the motion of the operation body 11. Therefore, a positive load and a negative load can be applied to the operation body 11.

Accordingly, by combining the movable load applying mechanism F25 and the magnetic click mechanism K26, a stronger load and a sudden load drop can be applied to the operation body 11. This allows a good click feeling to be given to the operator in accordance with the operator's operation.

The second magnetic body H26 is magnetized by the second coil H45, and, therefore, the magnetic generating mechanism FM25 also has the function of magnetizing the second magnetic body H26 of the magnetic click mechanism K26. Therefore, another magnetization mechanism used only to magnetize the second magnetic body H26 is not required. Accordingly, space saving is achieved, and the operation device 200 can be manufactured at lower cost.

Further, the first magnetic body H16 and the second magnetic body H26 respectively include the plurality of protruding portions H16t and the plurality of protruding portions H26t that are respectively magnetized such that different magnetic poles are alternated along the movement direction of the operation body 11, and, therefore, the first magnetic body H16 and the second magnetic body H26 are easily repeatedly subjected to attraction and repulsion. Accordingly, a positive load and a negative load can be easily applied to the operation body 11, and the magnetic click mechanism K26 can be easily provided. This makes it easier for a good click feeling to be provided to the operator in accordance with the operator's operation.

Further, the movable member H55 is formed of a soft magnetic body, and, therefore, a magnetic path is reliably formed from the first yoke H15 to the movable member H55 and from the movable member H55 to the first yoke H15, so that the magnetic particles JR in the magnetic viscous fluid 75 are aligned in a direction extending between opposite surfaces facing each other. Therefore, a stronger load is applied to the movable member H55 that moves in a direction traversing the direction extending between opposite surfaces facing each other in which the magnetic particles JR are aligned. Accordingly, a stronger load is applied on the operation body 11 via the movable member H55 and the movable shaft 11j, thereby providing a better operational feeling to the operator.

Also, the second yoke H25 is disposed facing the other side of the movable member H55, and, therefore, the magnetic particles JR can be aligned in a direction perpendicular to the direction of movement of the movable member H55, and a stronger load can be applied. Further, the magnetic viscous fluid 75 is filled in the second gap 5p between the second yoke H25 and the inner circumferential surface of the movable member H55, and, therefore, additional load can be applied to the movable member H55 that moves in a direction traversing the magnetic flux. In this way, even for a same magnetic field, a greater operational feeling can be provided to the operator.

Further, the movable member H55 is formed of a soft magnetic body, and, therefore, a magnetic path is reliably formed from the first yoke H15 to the second yoke H25 via the movable member H55, and from the second yoke H25 to the first yoke H15 via the movable member H55. Accordingly, the magnetic particles JR in the magnetic viscous fluid 75 disposed in the gap are reliably aligned in a direction extending between opposite surfaces facing each other.

Further, the first magnetic body H16 is disposed on the movable shaft 11j, and, therefore, a load from the movable load applying mechanism F25 and a load from the magnetic click mechanism K26 can be applied to the same movable shaft 11j, and a load can be applied to the operation body 11 in a balanced and efficient manner.

Further, as the first magnetic body H16 is disposed on the other side of the movable member H55, thinning of shape in the thickness direction can be achieved. Further, the load from the movable load applying mechanism F25 and the load from the magnetic click mechanism K26 can be applied to the same movable member H55, and the load can be applied to the operation body 11 in a balanced and efficient manner.

Note that the present invention is not limited to the above-described embodiments, but may be implemented in a modified manner, for example, as follows, and these modified embodiments are also within the technical scope of the present invention.

Modification Example 1

In the first embodiment described above, the movable member 55 is a soft magnetic body and the movable member 55 is suitably commonly used as the first magnetic body 16; however, the configuration is not limited thereto. For example, a separate first magnetic body may be disposed on the other side of the movable member 55.

Modification Example 2

In the first embodiment, a plurality of protruding portions 26t and a plurality of recessed portions 26r are alternately provided in the second magnetic body 26, and are respectively magnetized such that different magnetic poles are alternated along the movement direction of the operation body 11; however, the configuration is not limited thereto. For example, the second magnetic body 26 may be magnetized such that different magnetic poles alternate along the movement direction of the operation body 11, without being provided with the plurality of protruding portions H16t or the plurality of recessed portions 26r.

Modification Example 3 Modification Example 4

In the first embodiment described above, the second magnetic body 26 is magnetized such that different magnetic poles alternate along the movement direction of the operation body 11; however, the configuration is not limited thereto. For example, the first magnetic body 16 (the movable member 55) may be magnetized such that different magnetic poles alternate {modification example 3}. For example, the second magnetic body 26 may not be magnetized such that different magnetic poles alternate, and only the first magnetic body 16 (the movable member 55) may be magnetized such that different magnetic poles alternate {modification example 4}. In this case, it is more preferable that the second magnetic body 26 is magnetized by a magnetic field generated by energizing the first coil 35 of the magnetic generating mechanism FM5.

Modification Example 5

In the first embodiment described above, in order to further clarify the click feeling of the magnetic click mechanism K6, the plurality of through holes 55h are provided in the first magnetic body 16 (the movable member 55); however, the configuration not limited thereto, and the plate-like (disc-like) disc portion 55e that does not include the plurality of through holes 55h may be used.

Modification Example 6

In the second embodiment described above, the plural protruding portions H16t are provided in the first magnetic body H16, and the first magnetic body H16 is magnetized such that different magnetic poles alternate along the movement direction of the operation body 11; however, the configuration is not limited thereto. For example, the first magnetic body H16 may be configured to be magnetized such that different magnetic poles alternate along the movement direction of the operation body 11, without being provided with the plurality of protruding portions H16t.

Modification Example 7

In the second embodiment described above, the movable member H55 is suitably formed of a soft magnetic body; however, the configuration is not limited thereto, and the movable member H55 may be a non-magnetic body such as a synthetic resin.

Modification Example 8

In the second embodiment described above, the second yoke H25 is suitably provided, but the configuration may include only the first yoke H15.

Modification Example 9

In the above-described embodiments, the motion of the operation body 11 is a rotational motion; however, the configuration is not limited thereto, and the motion may be a sliding motion or a tilting motion. In addition, a combination of these motions may be implemented.

Modification Example 10

In the above-described embodiments, the magnetic viscous fluid 75 is provided to fill the housing space in which the movable member 55 or the movable member H55 is housed; however, the configuration is not limited thereto, and the magnetic viscous fluid 75 may be present at least in a part of the gap.

The operation device of the according to an aspect of the present invention can provide a stronger load and a sudden load reduction to the operation body, by combining a movable load applying mechanism and a magnetic click mechanism. Accordingly, a good click feeling can be given to the operator, in accordance with the operator's operation.

According to an aspect of the present invention, an operation device is characterized by including an operation member including an operation body that moves in an operation direction according to an operation by an operator; a support body configured to freely support a motion of the operation body; and an operational feeling variable unit configured to vary an operational feeling that is perceived by the operator, wherein the operation body includes a movable shaft that enables the motion, the operational feeling variable unit includes a movable load applying mechanism configured to apply a load to the operation body; and a magnetic click mechanism configured to apply a variable load to the operation body by a magnetic force, the movable load applying mechanism includes a movable member configured to move in engagement with the movable shaft; a magnetic generating mechanism facing the movable member by interposing a gap; and a magnetic viscous fluid configured to change in viscosity according to a strength of a magnetic field, the magnetic viscous fluid being present in at least a part of the gap, the magnetic generating mechanism includes a first coil configured to generate a magnetic field by being energized; a first yoke disposed on one side of the movable member so as to surround the first coil; and a control unit configured to control the energizing of the first coil, and wherein the magnetic viscous fluid is filled in a first gap that is the gap between the first yoke and the movable member, the magnetic click mechanism includes a first magnetic body configured to move in an interlocked manner with the motion of the operation body; and a second magnetic body disposed facing the first magnetic body, and wherein at least one of the first magnetic body and the second magnetic body is magnetized such that different magnetic poles alternate along a movement direction of the operation body.

According to this, an electric field is generated by energizing the first coil, and a magnetic path is formed to spread from the first yoke to the movable member, so that the magnetic particles in the magnetic viscous fluid align along the magnetic flux. Accordingly, a load is applied by the magnetic viscous fluid on the movable member that moves in a direction that traverses the magnetic flux formed between the first yoke and the movable member, and the load is applied to the operation body through the movable member and the movable shaft. On the other hand, in accordance with the motion of the operation body, the first magnetic body and the second magnetic body are repeatedly subjected to attraction and repulsion. Therefore, a positive load and a negative load can be applied to the operation body. Accordingly, a combination of a movable load applying mechanism and a magnetic click mechanism can provide a stronger load and a sudden load reduction to the operation body. This allows a good click feeling to be given to the operator in accordahce with the operator's operation.

The operation device according to an aspect of the present invention is further characterized in that at least one of the first magnetic body and the second magnetic body is energized by a magnetic field, which is generated by energizing the first coil or a second coil of the magnetic generating mechanism, the second coil being configured to generate a magnetic field by being energized.

According to this, the magnetic generating mechanism provided for applying a magnetic field to the magnetic viscous fluid also has the function of magnetizing the first magnetic body and the second magnetic body of the magnetic click mechanism, and, therefore, another magnetization mechanism used only for magnetizing the first magnetic body and the second magnetic body is not required. Accordingly, space saving is achieved, and the operation device can be manufactured at lower cost.

Further, the operation device according to an aspect of the present invention is characterized in that at least one of the first magnetic body and the second magnetic body includes plural protruding portions, formed on a surface facing another one of the first magnetic body and the second magnetic body, along the movement direction of the operation body, and the protruding portions are respectively magnetized such that different magnetic poles are alternated along the movement direction of the operation body.

According to this, the first magnetic body and the second magnetic body are easily subjected to attraction and repulsion. Accordingly, a positive load and a negative load can be easily applied to the operation body, and a good click feeling can easily be provided to the operator in accordance with the operator's operation.

Further, the operation device according to an aspect of the present invention is characterized in that at least one of the first magnetic body and the second magnetic body includes a recessed portion provided between two of the protruding portions adjacent to each other, the protruding portions and the recessed portions are alternately provided, and a current supplied for energizing the first coil or the second coil is controlled such that an alternating interval of switching ON/OFF the energizing in a case of a direct current, or a frequency in a case of an alternating current, is to be a value obtained by multiplying a reciprocal of an integer with an alternating interval of the protruding portions and the recessed portions.

This allows easy control of the click feeling of the magnetic click mechanism.

The operation device according to an aspect of the present invention is characterized in that the movable member is formed of a soft magnetic body.

According to this, a magnetic path is reliably formed from the first yoke to the movable member and from the movable member to the first yoke, so that the magnetic particles in the magnetic viscous fluid are aligned in a direction extending between opposite surfaces facing each other. Therefore, a stronger load is applied to the movable member that moves in a direction traversing the direction extending between opposite surfaces facing each other in which the magnetic particles are aligned. This causes a stronger load on the operation body via the movable member and the movable shaft, thereby providing a better operational feeling to the operator.

The operation device according to an aspect of the present invention is characterized in that the magnetic generating mechanism includes a second yoke disposed facing the movable member on another side of the movable member, and the magnetic viscous fluid is filled in a second gap that is the gap between the movable member and the second yoke.

According to this, the magnetic particles can be aligned in a direction perpendicular to the direction of movement of the movable member and a stronger load can be applied. Further, additional loads may be applied to the movable member moving in a direction traversing the magnetic flux. In this way, even for a same magnetic field, a greater operational feeling can be provided to the operator.

Further, the operation device according to an aspect of the present invention is characterized in that the movable shaft is configured to rotate, and the first magnetic body is provided on the movable shaft.

According to this, the load from the movable load applying mechanism and the load from the magnetic click mechanism can be applied to the same movable shaft, and the load can be applied to the operation body in a balanced and efficient manner.

The operation device according to an aspect of the present invention is characterized in that the first magnetic body is provided on another side of the movable member.

According to this, thinning of shape in the thickness direction is achieved. In addition, the load from the movable load applying mechanism and the load from the magnetic click mechanism can be applied to the same movable member, and the load can be applied to the operation body in a balanced and efficient manner.

The present invention is not limited to the above embodiments and may be modified appropriately without departing from the spirit of the present invention.

What is claimed is:

1. An operation device comprising:
    an operation member including an operation body that moves in an operation direction according to an operation by an operator;
    a support body configured to freely support a motion of the operation body; and an operational feeling variable unit configured to vary an operational feeling that is perceived by the operator, wherein the operation body includes a movable shaft that enables the motion, the operational feeling variable unit includes:
a movable load applying mechanism configured to apply a load to the operation body; and
a magnetic click mechanism configured to apply a variable load to the operation body by a magnetic force, the movable load applying mechanism includes:
a movable member configured to move in engagement with the movable shaft;
a magnetic generating mechanism facing the movable member by interposing a gap; and
a magnetic viscous fluid configured to change in viscosity according to a strength of a magnetic field, the magnetic viscous fluid being provided in at least a part of the gap, the magnetic generating mechanism includes:
a first coil configured to generate a magnetic field by being energized;
a first yoke disposed on one side of the movable member so as to surround the first coil; and
a control unit configured to control the energizing of the first coil, and wherein the magnetic viscous fluid is filled in a first gap that is the gap between the first yoke and the movable member, the magnetic click mechanism includes:
a first magnetic body configured to move in an interlocked manner with the motion of the operation body; and
a second magnetic body disposed facing the first magnetic body, and wherein one or both of the first magnetic body and the second magnetic body is magnetized such that different magnetic poles alternate along a movement direction of the operation body, wherein one or both of the first magnetic body and the second magnetic body is energized by a magnetic field;

a current supplied for energizing the one or both of the first magnetic body and the second magnetic body is controlled such that an alternating interval of switching ON/OFF the energizing in a case of a direct current, or a frequency in a case of an alternating current, is to be a value obtained by multiplying a reciprocal of an integer with an alternating interval of the alternating different magnetic poles.

2. The operation device according to claim 1, wherein the magnetic field is generated by energizing the first coil or a second coil of the magnetic generating mechanism.

3. The operation device according to claim 2, wherein one or both of the first magnetic body and the second magnetic body includes plural protruding portions, formed on a surface facing another one of the first magnetic body and the second magnetic body, along the movement direction of the operation body, and
the protruding portions are respectively magnetized such that different magnetic poles are alternated along the movement direction of the operation body.

4. The operation device according to claim 3, wherein one or both of the first magnetic body and the second magnetic body includes a recessed portion provided between two of the protruding portions adjacent to each other,
the protruding portions and the recessed portions are alternately provided.

5. The operation device according to claim 1, wherein the movable member is formed of iron.

6. The operation device according to claim 1, wherein the magnetic generating mechanism includes a second yoke disposed facing the movable member on another side of the movable member, and
the magnetic viscous fluid is filled in a second gap that is the gap between the movable member and the second yoke.

7. The operation device according to claim 1, wherein the movable shaft is configured to rotate, and
the first magnetic body is provided on the movable shaft.

8. The operation device according to claim 1, wherein the first magnetic body is provided on another side of the movable member.

* * * * *